US012422776B2

(12) United States Patent
Shao et al.

(10) Patent No.: US 12,422,776 B2

(45) Date of Patent: Sep. 23, 2025

(54) PROCESS CARTRIDGE AND POTENTIAL DETECTION PART

(71) Applicant: Zhuhai Pantum Electronics Co., Ltd., Zhuhai (CN)

(72) Inventors: Zhe Shao, Zhuhai (CN); Xiangchao Xia, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/515,230

(22) Filed: Nov. 20, 2023

(65) Prior Publication Data

US 2024/0168429 A1 May 23, 2024

(30) Foreign Application Priority Data

Nov. 21, 2022 (CN) ......................... 202211462864.6

(51) Int. Cl.
*G03G 15/00* (2006.01)
*G03G 15/08* (2006.01)
(Continued)

(52) U.S. Cl.
CPC ..... *G03G 21/1814* (2013.01); *G03G 15/0851* (2013.01); *G03G 15/5037* (2013.01);
(Continued)

(58) Field of Classification Search
CPC ............... G03G 15/02; G03G 15/0851; G03G 15/5037; G03G 15/751; G03G 21/0029;
(Continued)

(56) References Cited

U.S. PATENT DOCUMENTS

| | | | |
|---|---|---|---|
| 5,633,700 A | 5/1997 | Peck et al. | |
| 2006/0140674 A1 | 6/2006 | Sato | |

(Continued)

FOREIGN PATENT DOCUMENTS

| | | |
|---|---|---|
| EP | 0926570 A2 | 6/1999 |

OTHER PUBLICATIONS

The European Patent Office (EPO) The Extended European Search Report for Application No. 23211030.4, Jul. 30, 2024 9 Pages.

*Primary Examiner* — Sophia S Chen
(74) *Attorney, Agent, or Firm* — ANOVA LAW GROUP, PLLC

(57) ABSTRACT

The present disclosure provides a process cartridge and a potential detection part. The process cartridge includes a cartridge body, a photosensitive drum rotatably installed at the cartridge body, and a potential detection part configured to detect an electrical signal on the image-forming region. The potential detection part includes a detection starting portion and a detection ending portion; the detection starting portion and the detection ending portion respectively correspond to a detection starting position and a detection ending position of a detectable region of the potential detection part along a first direction; a maximum distance along the first direction between orthographic projections of the detection starting portion and the detection ending portion on the image-forming region is L1; a length of the image-forming region along the first direction is L2; the first direction is in parallel with an axis direction of the photosensitive drum; and L1/L2>⅓.

20 Claims, 12 Drawing Sheets

(51) Int. Cl.
*G03G 21/00* (2006.01)
*G03G 21/18* (2006.01)

(52) U.S. Cl.
CPC ....... *G03G 15/751* (2013.01); *G03G 21/0029* (2013.01); *G03G 21/1896* (2013.01); *G03G 2215/025* (2013.01); *G03G 2221/1869* (2013.01)

(58) Field of Classification Search
CPC .... G03G 21/105; G03G 21/18; G03G 21/181; G03G 21/1814; G03G 21/1825; G03G 21/1896; G03G 2215/025; G03G 2221/1869; G03G 21/1828
See application file for complete search history.

(56) References Cited

U.S. PATENT DOCUMENTS

| | | | |
|---|---|---|---|
| 2013/0223876 | A1 | 8/2013 | Sakurai et al. |
| 2016/0259261 | A1 | 9/2016 | Jota et al. |
| 2018/0210386 | A1* | 7/2018 | Shoji .................. G03G 15/0856 |
| 2019/0243304 | A1 | 8/2019 | Kim et al. |
| 2020/0278638 | A1* | 9/2020 | Takezawa ........ G03G 15/04036 |
| 2021/0080899 | A1 | 3/2021 | Mushika et al. |
| 2021/0364977 | A1 | 11/2021 | Ishihara |

* cited by examiner

PROCESS CARTRIDGE AND POTENTIAL DETECTION PART

CROSS-REFERENCE TO RELATED APPLICATION

The present disclosure claims the priority to Chinese patent application No. 202211462864.6, filed on Nov. 21, 2022, the entirety of which is incorporated herein by reference.

TECHNICAL FIELD

The present disclosure generally relates to the field of image-forming technology and, more particularly, relates to a process cartridge and a potential detection part.

BACKGROUND

An image-forming apparatus exposes a photosensitive drum (OPC) with a laser beam emitted from a laser unit, forms a latent image on the photosensitive drum through the exposure, develops the latent image and prints developed image on an image-forming medium for example, paper.

However, when there are abnormalities such as damage or dirt on the surface of the OPC, the ability of the OPC to induce charges may be abnormal, which may also lead to abnormal images outputted by the image-forming apparatus and bring a bad experience to users. Therefore, there is a need to develop a method capable of detecting whether the OPC surface is abnormal and whether a process cartridge meets expectation, thereby being beneficial for reminding the users in time.

SUMMARY

One aspect of the present disclosure provides a process cartridge, detachably installed in an image-forming apparatus main body. The process cartridge includes a cartridge body; a photosensitive drum, rotatably installed at the cartridge body, where the photosensitive drum is configured with an image-forming region capable of generating an electrostatic latent image; and a potential detection part, configured to detect an electrical signal on the image-forming region. The potential detection part includes a detection starting portion and a detection ending portion; the detection starting portion and the detection ending portion respectively correspond to a detection starting position and a detection ending position of a detectable region of the potential detection part along a first direction; a maximum distance along the first direction between orthographic projections of the detection starting portion and the detection ending portion on the image-forming region is L1; a length of the image-forming region along the first direction is L2; the first direction is in parallel with an axis direction of the photosensitive drum; and L1/L2>⅓.

Another aspect of the present disclosure provides a process cartridge, detachably installed in an image-forming apparatus main body. The process cartridge includes a cartridge body; and a photosensitive drum, rotatably installed at the cartridge body, where the photosensitive drum is disposed with an image-forming region capable of generating an electrostatic latent image. The cartridge body includes a potential detection part setting region configured to dispose a potential detection part; when the potential detection part is installed at the potential detection part setting region, the potential detection part is configured to detect an electrical signal on the image-forming region; and the potential detection part setting region includes a first region corresponding to a detection starting portion of the potential detection part and a second region corresponding to a detection ending portion of the potential detection part; a maximum distance along a first direction between orthographic projections of the first region and the second region on the imaging area is L1, and a length of the image-forming region along the first direction is L2, where L1/L2>⅓; and the first direction is in parallel with an axis direction of the photosensitive drum.

Another aspect of the present disclosure provides a potential detection part, configured to be disposed on a process cartridge. When the potential detection part is installed on the process cartridge, the potential detection part is configured to detect an electrical signal on an image-forming region of a photosensitive drum. The potential detection part includes a detection starting portion and a detection ending portion; the detection starting portion and the detection ending portion respectively correspond to a detection starting position and a detection ending position of a detectable region of the potential detection part along a first direction; a maximum distance along the first direction between orthographic projections of the detection starting portion and the detection ending portion on the image-forming region is L1; a length of the image-forming region along the first direction is L2; the first direction is in parallel with an axis direction of the photosensitive drum; and L1/L2>⅓.

Other aspects of the present disclosure can be understood by those skilled in the art in light of the description, the claims, and the drawings of the present disclosure.

BRIEF DESCRIPTION OF THE DRAWINGS

To clearly describe technical solutions of various embodiments of the present disclosure, the drawings which need to be used for describing various embodiments are described below. Obviously, the drawings in the following description are merely some embodiments of the present disclosure. For those skilled in the art, other drawings may be obtained in accordance with the drawings without creative efforts.

DETAILED DESCRIPTION

Figure 1:
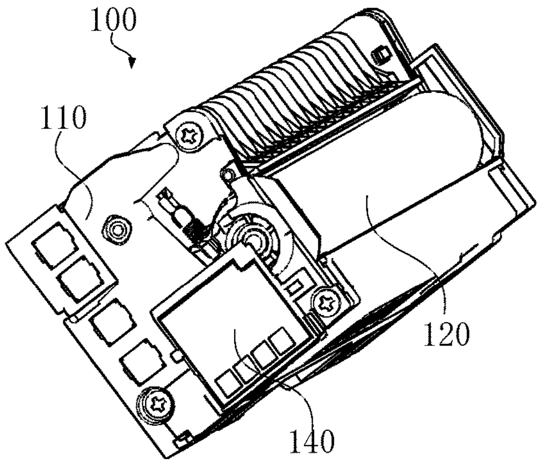
FIG. 1 illustrates a structural schematic of a process cartridge provided by exemplary embodiments of the present disclosure.

In order to better understand the technical solutions of the present disclosure, embodiments of the present disclosure are described in detail below with reference to accompanying drawings.

It should be understood that described embodiments are only some of embodiments of the present disclosure, rather than all of embodiments. According to embodiments in present disclosure, all other embodiments obtained by those skilled in the art without making creative efforts should fall in the protection scope of present disclosure.

The terms used in embodiments of the present disclosure are only for the purpose of describing specific embodiments and not intended to limit the present disclosure. As used in embodiments and appended claims, the singular forms "a," "the" and "said" are also intended to include plural forms, unless the context clearly dictates otherwise.

It should be understood that the term "and/or" used in the present disclosure is only an association relationship describing related objects, indicating that there may be three relationships. For example, A and/or B may indicate three cases: A alone, both A and B, and B alone. In addition, the character "/" in the present disclosure indicate that related objects are an "or" relationship.

It should be noted that the orientation terms such as "upper", "lower", "left" and "right" described in embodiments of the present disclosure are described from the perspective shown in the drawings and should not be understood as a limitation on embodiments of the present disclosure. In addition, it should be understood in the present disclosure that when an element is referred to as being connected "on" or "under" another element, it may not only be directly connected "on" or "under" another element, but also may be indirectly connected "on" or "under" another element through an intermediate element.

In addition, the "orthographic projection" used in the present disclosure describes the direction of projection. The orthographic projection on an image-forming region can be understood as the radial direction of a photosensitive drum; or may also be the projection direction perpendicular to the axial direction of the photosensitive drum.

An electrical signal is obtained by detecting the image-forming region of the photosensitive drum.

Currently, there are different detection methods to determine whether the image-forming region on the surface of the photosensitive drum is normal. For example, a detection point on the image-forming region may be directly contacted, and whether the image-forming region is normal may be determined by obtaining the electrical signal of the detection point on the image-forming region. However, direct contact with the image-forming region may cause wear on the surface of the photosensitive drum, which may affect the service life of the photosensitive drum. If the detection point on the image-forming region is improperly selected, it may easily lead to abnormal determination result on whether the image-forming region is normal.

In order to solve above technical problems, the present disclosure provides a solution to determine whether the image-forming region is normal by detecting the potential difference between different regions of the image-forming region after exposure. In the process of implementing above solution, the circuit configured for detection itself may have certain inherent signal in the process of detecting the potential difference, which may interfere with the electrical signal generated in the process of detecting the potential difference. As a result, it may not distinguish or difficult to distinguish in the electrical signal finally obtained, and also may not determine whether the image-forming region is normal according to the electrical signal generated by detecting the potential difference.

In order to solve above problems, as shown in FIGS. 1-4, the present disclosure provides a process cartridge 100, which may be detachably installed in an image-forming apparatus main body 300. The process cartridge 100 may include a cartridge body 110, a photosensitive drum 120 and a potential detection part 130. The photosensitive drum 120 may be rotatably installed in the cartridge body 110. The photosensitive drum 120 may be disposed with an image-forming region that may generate an electrostatic latent image. The potential detection part 130 may be configured to detect the electrical signal on the image-forming region.

Figure 5:
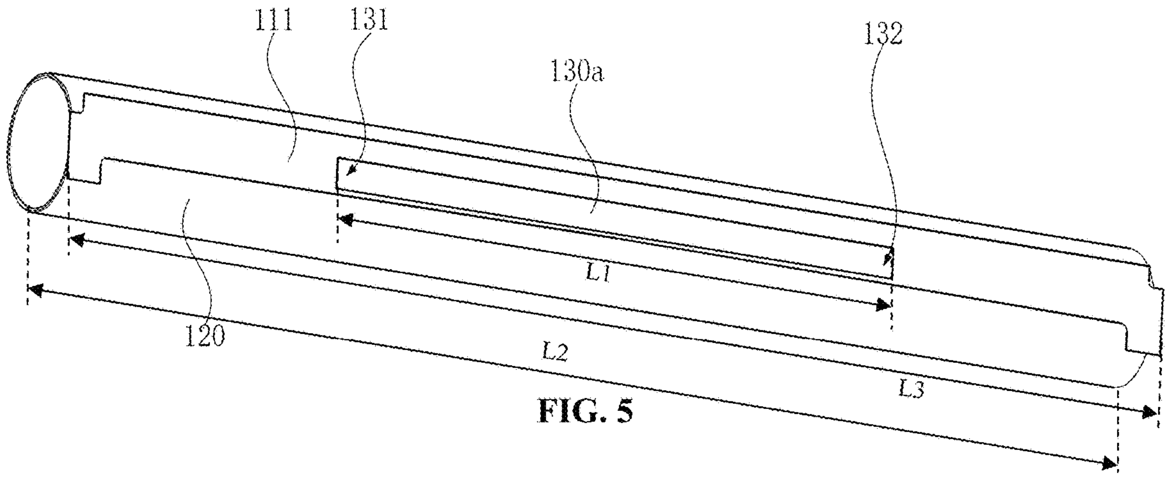
FIG. 5 illustrates an assembly schematic of a photosensitive drum, a cleaning blade and a potential detection part provided by exemplary embodiments of the present disclosure.
Figure 6:
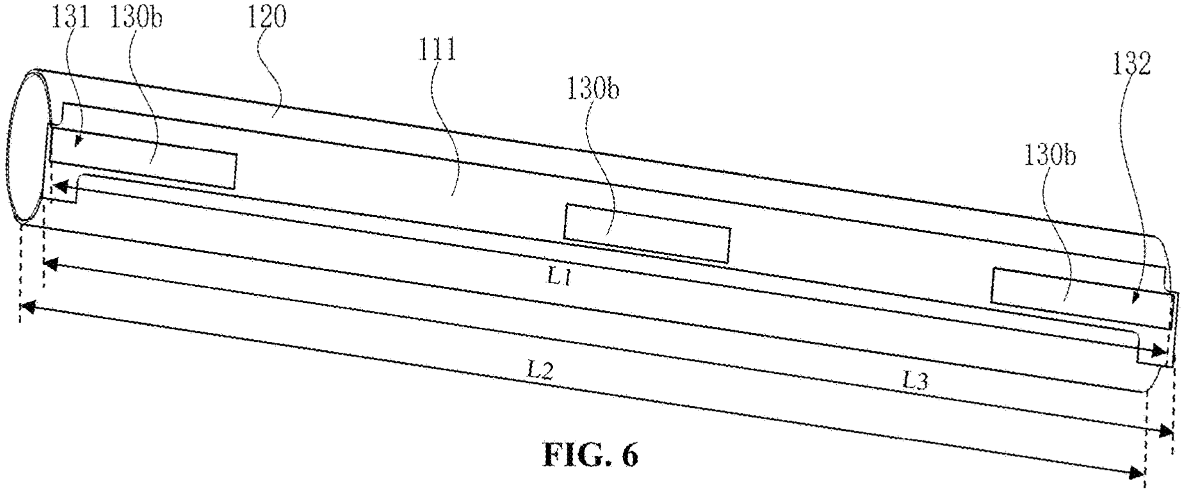
FIG. 6 illustrates another assembly schematic of a photosensitive drum, a cleaning blade and a potential detection part provided by exemplary embodiments of the present disclosure.

Furthermore, as shown in FIGS. 5-6, the potential detection part 130 may include a detection starting portion 131 and a detection ending portion 132; the detection starting portion 131 and the detection ending portion 132 may respectively correspond to a detection starting position and a detection ending position of the detectable region of the potential detection part 130 along the first direction; along the first direction, the maximum distance between the orthographic projections of the detection starting portion 131 and the detection ending portion 132 on the image-forming region is L1; the length of the image-forming region along the first direction is L2; and the first direction may be in parallel with the axis direction of the photosensitive drum 120, where L1/L2>⅓.

Above-mentioned process cartridge 100 may be disposed with the potential detection part 130 capable of detecting the electrical signal in the image-forming region. When an electrostatic latent image is formed on the image-forming region of the photosensitive drum 120 and passes the potential detection part 130, according to the potential difference between different regions on the image-forming region, the circuit itself where the potential detection part 130 is located may also have an inherent signal while the potential detection part 130 obtains the electrical signal corresponding to the potential difference. The inherent signal may not change significantly as the length of the potential detection part 130 increases or decreases. When the maximum distance L1 along the first direction between the detection starting portion 131 and the detection ending portion 132 of the potential detection part 130 that can perform potential detection is larger, that is, when the maximum distance between the orthographic projections of the detection starting position and the detection ending position on the image-forming region is larger, the amplitude of the electrical signal obtained by the potential detection part 130 corresponding to the potential difference may be also larger, such that the electrical signal corresponding to the potential difference obtained by the potential detection part 130 may be more obvious than the inherent signal of the circuit where the potential detection part 130 is located. In addition, when the ratio L1/L2 between L1 and the length L2 of the image-forming region along the first direction is greater than ⅓, the interference of the inherent signal in the electrical signal may be reduced. Therefore, the electrical signal on the surface of the photosensitive drum 120 may be conveniently obtained to determine whether the surface of the photosensitive drum 120 is normal, and furthermore, whether the process cartridge 100 meets expectation may be determined.

Practically, in some embodiments, the electrical signals transmitted by the potential detection part 130 may include at least two different electrical signals, that is, at least include the inherent signal of the circuit itself where the potential detection part 130 is located, and the electrical signal obtained by the potential detection part 130 according to the potential difference between different regions on the image-forming region. The inherent signal may be the property of the circuit itself where the potential detection part 130 is located and may not be related to the potential difference between different regions on the image-forming region of the photosensitive drum 120. The inherent signal may not be configured to determine the condition of the photosensitive drum 120, and also cause interference to the electrical signal obtained according to the potential difference. Therefore, when the inherent signal is difficult to be changed, by configuring the potential detection part 130 and the image-forming region, the amplitude of the electrical signal obtained according to the potential difference may be changed, which may avoid the interference of the inherent signal and may be convenient to determine whether the photosensitive drum 120 and the process cartridge 100 are normal and meet expectation.

It can be understood that the region on the potential detection part 130 that may obtain the electrical signal according to the potential difference on the image-forming region may be the detectable region. The detectable region may be the orthographic projection of the potential detection part 130 on the image-forming region. Along the first direction, the detectable region may include the detection starting position and the detection ending position. The detection starting position may correspond to the detection starting portion 131 on the potential detection part 130, and the detection ending position may correspond to the detection ending portion 132 on the potential detection part 130.

In embodiments of the present invention, for example, the image-forming apparatuses may include inkjet printers, laser printers, light emitting diode (LED) printers, copiers, scanners or multi-function fax machines, and multi-function peripherals (MFP) having above functions in a single device and the like. The image-forming apparatus may form the image on a recording medium (e.g., paper) according to pattern information and a developer (e.g., toner) stored in the process cartridge 100.

Optionally, the image-forming apparatus main body 300 may include an image-forming control unit 301 and an optical scanning unit. The process of forming the electrostatic latent image on the image-forming region is described in the following. A charging roller may rotate and contact the photosensitive drum 120 to charge the image-forming region on the surface of the photosensitive drum 120, and the image-forming control unit 301 may control the optical scanning unit to emit a beam and scan the image-forming region on the surface of the photosensitive drum 120 according to pattern information, such that the electrostatic latent image may be formed on the image-forming region of the surface of the photosensitive drum 120 after being charged by the charging roller.

It can be understood that L1/L2>⅓ is satisfied, above-mentioned value of L1/L2 may have the effect of reducing the interference of the inherent signal in the electrical signals and being convenient to obtain the electrical signals on the surface of the photosensitive drum 120. For example, the values of L1/L2 may be ½, ⅔, ¾, ⅘, 1 or the like. Obviously, the value of L1/L2 may not be limited to above-mentioned values.

In an optional embodiment, the electrical signals may include a first electrical signal, the potential detection part 130 may be configured to generate the first electrical signal corresponding to preset test pattern information, and the first electrical signal may be configured to determine whether the process cartridge 100 meets expectation. When the electrostatic latent image corresponding to the preset test pattern information is formed on the photosensitive drum 120 after exposure, the electrical signal detected by the potential detection part 130 may be the first electrical signal. At this point, according to the first electrical signal, whether the photosensitive drum 120 is normal and whether the process cartridge 100 meets expectation may be determined.

For example, if the image-forming control unit 301 sends same pattern information in two jobs and the electrostatic latent images formed on the photosensitive drum 120 are same, the electrical signals sensed by the potential detection part 130 twice should also be same or similar. Therefore, when there is no abnormality in the photosensitive drum

120, the electrical signal corresponding to the preset test pattern information obtained by the potential detection part 130 or processed electrical signal corresponding to above-mentioned preset test pattern information may be configured as reference information. When the electrostatic latent image on the image-forming region corresponds to the preset test pattern information, the first electrical signal obtained by the potential detection part 130 may be compared with the reference information; and according to comparison result, whether the photosensitive drum 120 is normal and whether the process cartridge 100 meets expectation may be determined. It can be understood that even if the electrostatic latent images formed twice on the image-forming region of the photosensitive drum 120 are same, certain difference may be in the electrical signals obtained by the potential detection part 130. Therefore, by comparing the electrical signal obtained by extracting the potential detection part 130 with a characteristic value in the reference information, or according to similarity between the electrical signal obtained by the potential detection part 130 and the reference information, whether the photosensitive drum 120 is normal and whether the process cartridge 100 meets expectation may be determined.

Optionally, the first electrical signal may include above-mentioned inherent signal or may be an electrical signal generated after filtering out the inherent signal.

In an optional embodiment, the electrical signals may include the first electrical signal, the potential detection part 130 may be configured to generate the first electrical signal corresponding to the preset test pattern information, the first electrical signal may be configured to generate a second electrical signal different from the first electrical signal, and the second electrical signal may be configured to determine whether the process cartridge 100 meets expectation. The first electrical signal may be processed to obtain the second electrical signal that meets requirement, which may be convenient for comparison to determine whether the process cartridge 100 meets expectation.

In other embodiments, according to different determination manners, the first electrical signal may also be directly configured for comparison to determine whether the process cartridge 100 meets expectation.

In an optional embodiment, the potential detection part 130 may be spaced apart from the image-forming region, and the electrical signal may be a voltage signal. When the potential detection part 130 is spaced apart from the image-forming region, the surfaces of the potential detection part 130 and the photosensitive drum 120 may actually form a capacitor-like structure. When the electrostatic latent image is on the image-forming region, a potential difference may be between different regions on the image-forming region. Therefore, when the potential detection part 130 changes from being opposite to one region on the image-forming region to being opposite to another region on the image-forming region with a different potential, the potential detection part 130 may generate the electrical signal accordingly. Above electrical signal may be related to the electrostatic latent image on the image-forming region. If the surface of the photosensitive drum 120 is abnormal, the electrostatic latent image may be abnormal, thereby affecting the property of the electrical signal. Therefore, whether the image-forming region on the surface of the photosensitive drum 120 is normal may be determined according to the electrical signal.

Figure 3:
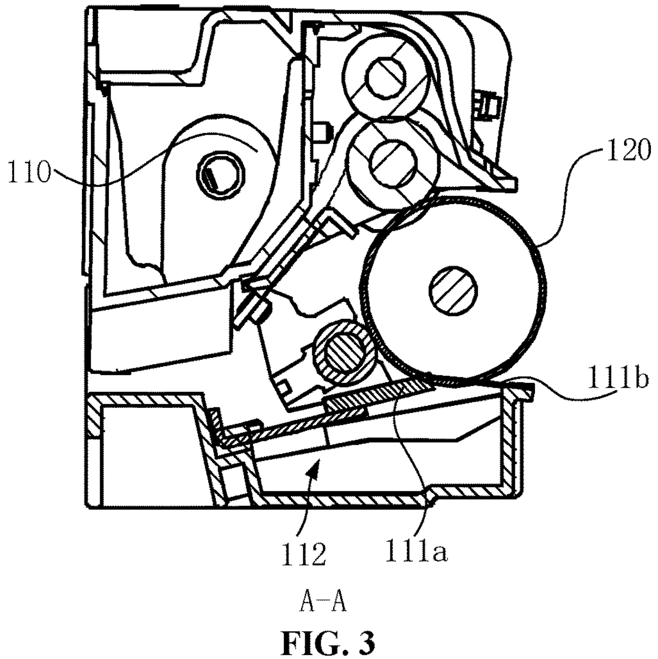
FIG. 3 illustrates a cross-sectional view along an A-A direction in FIG. 2.
Figure 4:
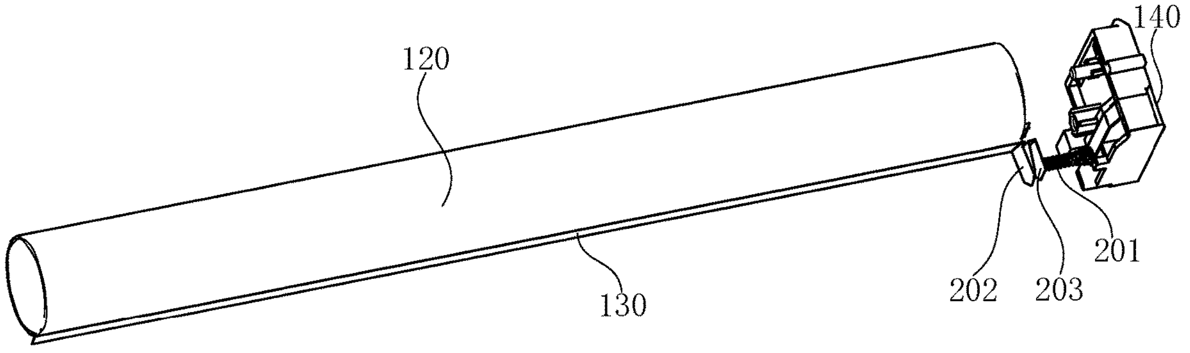
FIG. 4 illustrates a partial structural schematic of a process cartridge provided by exemplary embodiments of the present disclosure.

In an optional embodiment, as shown in FIG. 3, the cartridge body 110 may further include a scraping blade 111. The scraping blade 111 may include an insulating portion. One side of the insulating portion may be in contact with the surface of the image-forming region, and the potential detection part 130 may be disposed on another side of the insulating portion away from the image-forming region.

Furthermore, as shown in FIG. 3, the scraping blade 111 may be a cleaning blade 111*a*. The scraping blade 111 may be configured to scrape the toner on the surface of the photosensitive drum 120, and the distance between the scraping blade 111 and the photosensitive drum 120 may be relatively close. Therefore, the potential detection part 130 may be disposed on the scraping blade 111, such that a capacitor structure may be formed between the potential detection part 130 and the surface of the photosensitive drum 120. In addition, the scraping blade 111 may be in direct contact with the photosensitive drum 120. Therefore, the potential detection part 130 may be disposed on another side of the insulating portion of the scraping blade 111 away from the image-forming region to prevent the potential detection part 130 from being electrically connected to the surface of the photosensitive drum 120, such that the potential detection part 130 may realize potential detection of the image-forming region on the surface of the photosensitive drum 120 through the capacitor structure. When the toner is adsorbed on the surface of the photosensitive drum 120 and after transferring is performed, the cleaning blade 111*a* may scrape off residual toner on the photosensitive drum 120. The residual toner may be stored in a waste toner bin 112, such that the image-forming region on the surface of the photosensitive drum 120 may be kept clean before the start of next printing job and may not interfere with the image-forming of next printing job.

Furthermore, as shown in FIG. 3, the scraping blade 111 may be a sealing scraping blade 111*b*. The sealing scraping blade 111*b* may be configured to seal the waste toner bin 112, which may prevent waste toner in the waste toner bin 112 from leaking out of the waste toner bin 112 to contaminate the image-forming apparatus.

It can be understood that the region, which may form the capacitor structure and capacitor-like structure on the process cartridge 100 with the image-forming region on the photosensitive drum 120, may be the region where the potential detection part 130 is disposed; and when the potential detection part 130 electrically detects the photosensitive drum 120, the photosensitive drum 120 should have been exposed by the optical scanning unit, that is, the image-forming region on the surface of the photosensitive drum 120 may already have the electrostatic latent image. Therefore, in other embodiments, if other regions of the process cartridge 100 meet above condition, the potential detection part 130 may also be disposed at other positions or regions other than the scraping blade 111.

In an optional embodiment, the length of the orthographic projection of the insulating portion on the image-forming region along the first direction is L3, where L3≥L1. Through above configuration, it is ensured that after the potential detection part 130 that meets proportional requirement is installed on the insulating portion, the scenario that a portion of the potential detection part 130 has no corresponding installation position may not occur. Therefore, the installation of the potential detection part 130 may be more stable, and electrical signal may be obtained more accurately.

In an optional embodiment, the potential detection part 130 may be in contact with the surface of the image-forming region, and the electrical signal may be a current signal. The potential detection part 130 may also be in direct contact with the image-forming region on the surface of the photosensitive drum 120 and obtained current signal may be configured to determine whether the photosensitive drum 120 is normal.

It can be understood that both the current signal and the voltage signal may correspond to the potential difference on the image-forming region. Therefore, both the current signal and the voltage signal may be configured to determine whether the photosensitive drum 120 is normal. In addition, if there are other types of electrical signals that may change correspondingly to the potential difference on the image-forming region, these electrical signals may also be configured to determine whether the photosensitive drum 120 is normal.

In an optional embodiment, the process cartridge 100 may further include a conversion circuit configured to convert the current signal detected by the potential detection part 130 into the voltage signal. After the potential detection part 130 contacts the image-forming region on the surface of the photosensitive drum 120 to obtain the current signal, the current signal may also be processed and converted into the voltage signal, which may also be configured to determine whether the photosensitive drum 120 is normal.

In an optional embodiment, as shown in FIG. 5, the potential detection part 130 may include a strip-shaped conductive strip 130*a*. The strip-shaped conductive strip 130*a* may be easy to be installed, and multiple regions on the conductive strip 130*a* may be configured to detect the electrical signals.

In an optional embodiment, as shown in FIG. 6, the potential detection part 130 may include at least two potential detection subunits 130*b* arranged to be spaced apart. One of two potential detection subunits 130*b* arranged to be spaced apart may include the potential detection starting portion 131, and another potential detection subunit 130*b* may include the potential detection ending portion 132. On the basis of meeting the conditions, the electrical signals may be obtained, and the interference of the inherent signal may be reduced. Two adjacent potential detection subunits 130*b* arranged to be spaced apart may be electrically connected through a wire; or different potential detection subunits 130*b* may be electrically connected to different wires, and different wires may be finally connected to same circuit, which may also transmit the electrical signals.

Figure 2:
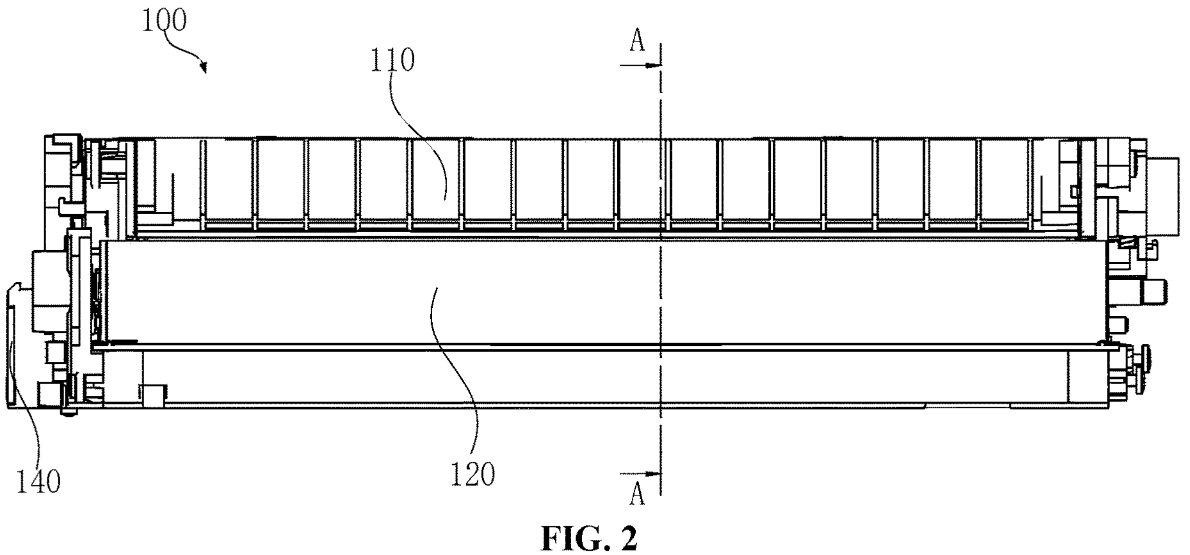
FIG. 2 illustrates a front view of a process cartridge provided by exemplary embodiments of the present disclosure.

As shown in FIGS. 1-3, the present disclosure provides the process cartridge 100, which is detachably installed in the image-forming apparatus. The process cartridge 100 may include the cartridge body 110 and the photosensitive drum 120 which is rotatably installed on the cartridge body 110. The photosensitive drum 120 may be configured with the image-forming region that may generate the electrostatic latent image.

Figure 7:
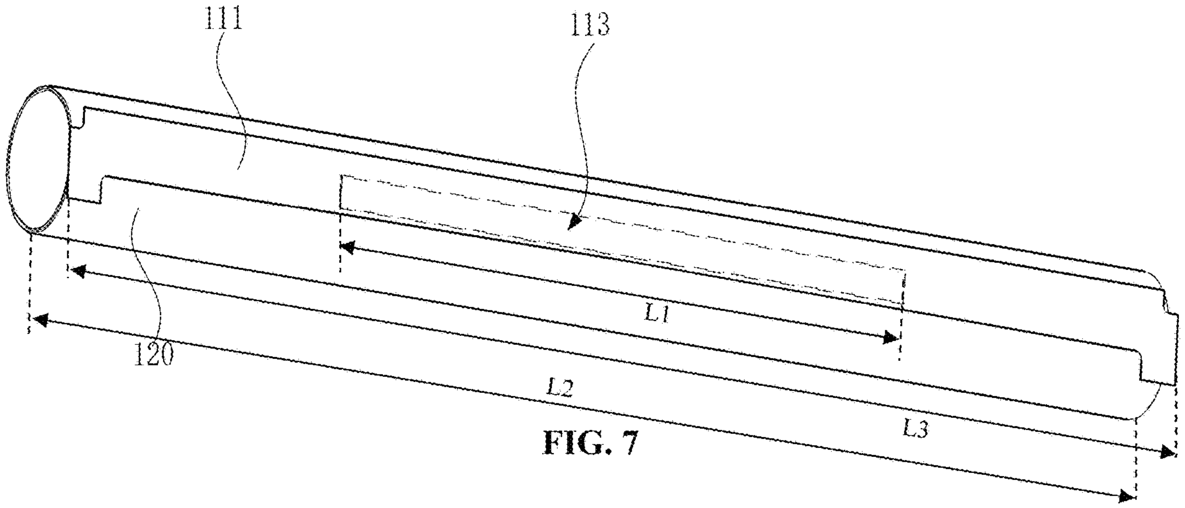
FIG. 7 illustrates a schematic of a region where a potential detection part is disposed on a cleaning blade provided by exemplary embodiments of the present disclosure.

Furthermore, as shown in FIG. 7, the cartridge body 110 may include a potential detection part setting region 113. The potential detection part setting region 113 may be configured to set the potential detection part 130. When the potential detection part 130 is installed in the potential detection part setting region 113, the potential detection part 130 may be configured to detect the electrical signal on the image-forming region. The potential detection part setting region 113 may include a first region corresponding to the detection starting portion 131 of the potential detection part and a second region corresponding to the detection ending portion 132 of the potential detection part. The maximum distance along the first direction between the orthographic projections of the first region and the second region on the image-forming region is L1, and the length of the image-forming region along the first direction is L2, where L1/L2>⅓. The first direction may be in parallel with the axis direction of the photosensitive drum 120.

Above-mentioned process cartridge 100 may be disposed with the potential detection part setting region 113 which may be configured to install the potential detection part 130. The potential detection part 130 may detect the signal on the image-forming region after being installed on the process cartridge 100. When the electrostatic latent image is formed on the image-forming region of the photosensitive drum 120 and passes the potential detection part 130, according to the potential difference between different regions on the image-forming region, the potential detection part 130 may obtain the electrical signal corresponding to the potential difference, and the circuit itself where the potential detection part 130 is located may also have the inherent signal. The inherent signal may not change significantly as the length of the potential detection part 130 increases or decreases. When the maximum distance L1 along the first direction between the detection starting portion 131 and the detection ending portion 132 of the potential detection part 130 that can perform potential detection is larger, that is, when the maximum distance between the orthographic projections of the detection starting position and the detection ending position on the image-forming region is larger, the amplitude of the electrical signal obtained by the potential detection part 130 corresponding to the potential difference may be also larger, such that the electrical signal corresponding to the potential difference obtained by the potential detection part 130 may be more obvious than the inherent signal of the circuit where the potential detection part 130 is located. In addition, when the ratio L1/L2 between L1 and the length L2 of the image-forming region along the first direction is greater than ⅓, the interference of the inherent signal in the electrical signal may be reduced. Therefore, the electrical signal on the surface of the photosensitive drum 120 may be conveniently obtained to determine whether the surface of the photosensitive drum 120 is normal, and furthermore, whether the process cartridge 100 meets expectation may be determined.

It can be understood that L1/L2>⅓ is satisfied, above-mentioned value of L1/L2 may have the effect of reducing the interference of the inherent signal in the electrical signals and being convenient to obtain the electrical signals on the surface of the photosensitive drum 120. For example, the values of L1/L2 may be ½, ⅔, ¾, ⅘, 1 or the like. Obviously, the value of L1/L2 may not be limited to above-mentioned values. That is, depending on the application of the process cartridge 100, the size of the potential detection part 130 may be set accordingly, such that after the potential detection part 130 is installed in the potential detection part setting region 113 of the process cartridge 100, L1/L2>⅓.

In an optional embodiment, the electrical signal may include the first electrical signal. When the potential detection part 130 is installed in the potential detection part setting region 113, the potential detection part 130 may be configured to generate the first electrical signal corresponding to the preset test pattern information, and the first electrical signal may be configured to determine whether the process cartridge 100 meets expectation. After the potential detection part 130 is installed in the potential detection part setting region 113, and when the electrostatic latent image corresponding to the preset test pattern information is formed on the photosensitive drum 120 after exposure, the electrical signal detected by the potential detection part 130 may be the first electrical signal. At this point, according to the first electrical signal, whether the photosensitive drum

120 is normal and whether the process cartridge 100 meets expectation may be determined.

In other embodiments, according to different determination manners, the first electrical signal may also be directly configured for comparison to determine whether the process cartridge 100 meets expectation.

In an optional embodiment, the potential detection part setting region 113 may be spaced apart from the image-forming region, such that the potential detection part 130 may be spaced apart from the image-forming region after being installed in the potential detection part setting region 113, and the electrical signal may be the voltage signal. By configuring the potential detection part setting region 113 to be spaced apart from the image-forming region, after the potential detection part 130 is installed in the potential detection part setting region 113, the surfaces of the potential detection part 130 and the photosensitive drum 120 may actually form a capacitor-like structure when the potential detection part 130 is spaced apart from the image-forming region. When the electrostatic latent image is on the image-forming region, the potential difference may be between different regions on the image-forming region. Therefore, when the image-forming region opposite to the potential detection part 130 changes from being opposite to one region on the image-forming region to another region on the image-forming region with the different potential, the potential detection part 130 may generate the electrical signal accordingly. Above-mentioned electrical signal may be related to the electrostatic latent image on the image-forming region. If an abnormality occurs on the surface of the photosensitive drum 120, the distribution of the electrostatic latent image may be abnormal, thereby affecting the property of the electrical signal. Therefore, whether the image-forming region on the surface of the photosensitive drum 120 is normal may be determined according to the electrical signal.

In an optional embodiment, as shown in FIG. 3, the cartridge body 110 may further include the scraping blade 111. The scraping blade 111 may include the insulating portion, one side of the insulating portion may be in contact with the surface of the image-forming region, and the potential detection part setting region 113 may be located on another side of the insulating portion away from the image-forming region.

Furthermore, as shown in FIG. 3, the scraping blade 111 may be the cleaning blade 111*a*. The scraping blade 111 may be configured to scrape the toner on the surface of the photosensitive drum 120, and the distance between the scraping blade 111 and the photosensitive drum 120 may be relatively close. Therefore, the potential detection part 130 may be disposed on the scraping blade 111, such that a capacitor structure may be formed between the potential detection part 130 and the surface of the photosensitive drum 120 after the potential detection part 130 is installed on the potential detection part setting region 113. In addition, the scraping blade 111 may be in direct contact with the photosensitive drum 120. Therefore, the potential detection part 130 may be disposed on another side of the insulating portion of the scraping blade 111 away from the image-forming region to prevent the potential detection part 130 from being electrically connected to the surface of the photosensitive drum 120, such that the potential detection part 130 may realize potential detection of the image-forming region on the surface of the photosensitive drum 120 through the capacitor structure. When the toner is adsorbed on the surface of the photosensitive drum 120 and after transferring is performed, the cleaning blade 111*a* may scrape off residual toner on the photosensitive drum 120. The residual toner may be stored in the waste toner bin 112, such that the image-forming region on the surface of the photosensitive drum 120 may be kept clean before the start of next printing job and may not interfere with the image-forming of next printing job.

In an optional embodiment, when the potential detection part 130 is installed in the potential detection part setting region 113, the potential detection part 130 may be in contact with the surface of the image-forming region, and the electrical signal may be a current signal. The potential detection part 130 may also be in direct contact with the image-forming region on the surface of the photosensitive drum 120 and obtained current signal may be configured to determine whether the photosensitive drum 120 is normal.

The present disclosure provides an image-forming apparatus, including the process cartridge 100 as described above.

In above-mentioned image-forming apparatus, the process cartridge 100 is disposed with the potential detection part 130 capable of detecting electrical signals in the image-forming region. Therefore, when the electrostatic latent image is formed on the image-forming region of the photosensitive drum 120 and passes the potential detection part 130, according to the potential difference between different regions on the image-forming region, the potential detection part 130 may obtain the electrical signal corresponding to the potential difference. In addition, the circuit itself where the potential detection part 130 is located may also have the inherent signal. The inherent signal may not change significantly as the length of the potential detection part 130 increases or decreases. Furthermore, when the maximum distance L1 along the first direction between the detection starting portion 131 and the detection ending portion 132 on the potential detection part 130 that can perform potential detection becomes larger, that is, when the maximum distance between the orthographic projections of the detection starting position and the detection ending position on the image-forming region is larger, the amplitude of the electrical signal obtained by the potential detection part 130 corresponding to the potential difference may be also larger. Therefore, the electrical signal corresponding to the potential difference obtained by the potential detection part 130 may be more obvious than the inherent signal of the circuit where the potential detection part 130 is located. In addition, when the ratio (L1/L2) between L1 and the length L2 of the image-forming region along the first direction is greater than ⅓, the interference of the inherent signal in the electrical signal may be reduced. Therefore, the electrical signal on the surface of the photosensitive drum 120 may be conveniently obtained to determine whether the surface of the photosensitive drum 120 is normal, and furthermore, whether the process cartridge 100 meets expectation may be determined.

Figure 8:
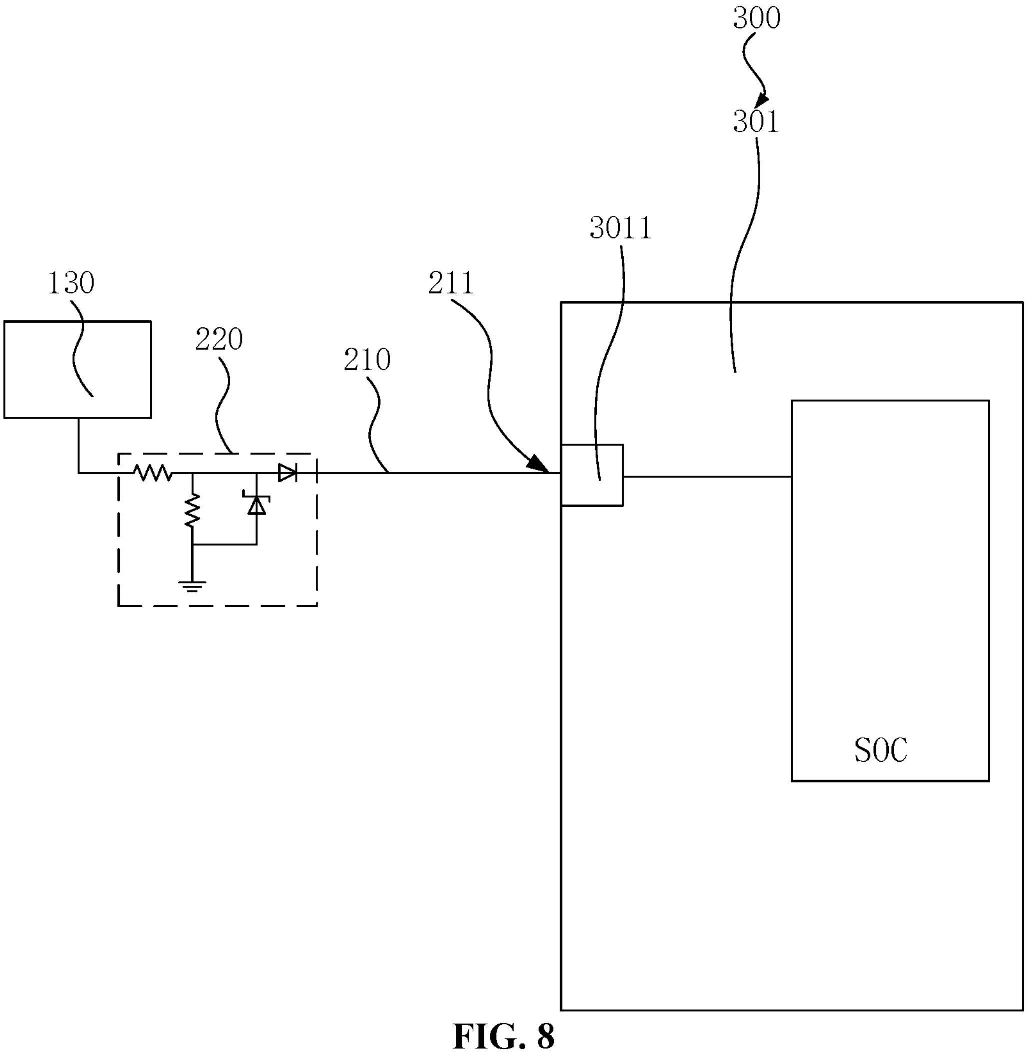
FIG. 8 illustrates an assembly schematic of a potential detection part, a first connection part, and an image-forming apparatus main body provided by exemplary embodiments of the present disclosure.

In an optional embodiment, as shown in FIG. 8, the image-forming apparatus may further include the image-forming control unit 301. The image-forming control unit 301 may be configured to control the image-forming apparatus to form a preset electrostatic latent image on the surface of the photosensitive drum 120 and determine whether the process cartridge 100 meets expectation based on the second electrical signal generated according to the first electrical signal outputted by the potential detection part 130. The image-forming control unit 301 may send job to form the preset electrostatic latent image on the surface of the photosensitive drum 120. At this point, the potential detection part 130 may detect the first electrical signal according to the image-forming region on the surface of the photosensitive drum 120, and the first electrical signal may be transmitted or processed to form the second electrical signal. The image-forming control unit 301 may determine whether the process cartridge 100 meets expectation according to the second electrical signal. It should be noted that SOC in FIG. 8 denotes system-on-chip.

It can be understood that according to the preset electrostatic latent image, the electrical signals obtained by the potential detection part 130 at different times may be same or similar. Therefore, the image-forming control unit 301 may pre-store electrical signal information corresponding to the preset electrostatic latent image. When the image-forming control unit 301 controls the surface of the photosensitive drum 120 to form the preset electrostatic latent image, the image-forming control unit 301 may compare the electrical signal obtained by the potential detection part 130 with the pre-stored electrical signal information, which is configured to determine whether the process cartridge 100 meets expectation.

As shown in FIGS. 1, 2, and 4-6, the present disclosure provides the potential detection part 130 for being disposed on the process cartridge 100. When the potential detection part 130 is installed on the process cartridge 100, the potential detection part 130 may be configured to detect the electrical signal on the image-forming region of the photosensitive drum 120. The potential detection part may include the detection starting portion 131 and the detection ending portion 132. The detection starting portion 131 and the detection ending portion 132 may respectively correspond to the detection starting position and the detection ending position of the detectable region of the potential detection part 130 along the first direction. The maximum distance along the first direction between the orthographic projections of the detection starting portion 131 and the detection ending portion 132 on the image-forming region is L1, and the length of the image-forming region along the first direction is L2, the first direction is in parallel with the axis direction of the photosensitive drum 120, and L1/L2>⅓.

Above-mentioned potential detection part 130 may be installed on the process cartridge 100. When the potential detection part 130 is installed on the process cartridge 100, the potential detection part 130 may detect the electrical signal on the image-forming region of the photosensitive drum 120. When an electrostatic latent image is formed on the image-forming region of the photosensitive drum 120 and passes the potential detection part 130, according to the potential difference between different regions on the image-forming region, the potential detection part 130 may obtain the electrical signal corresponding to the potential difference; and the circuit itself where the potential detection part 130 is located may also have the inherent signal. The inherent signal may not change significantly as the length of the potential detection part 130 increases or decreases. Furthermore, when the maximum distance L1 along the first direction between the detection starting portion 131 and the detection ending portion 132 on the potential detection part 130 that can perform potential detection becomes larger, that is, when the maximum distance between the detection starting position and the detection ending position on the image-forming region is larger, the amplitude of the electrical signal corresponding to the potential difference obtained by the potential detection part 130 may be also larger. Therefore, the electrical signal corresponding to the potential difference obtained by the potential detection part 130 may be more obvious than the inherent signal of the circuit where the potential detection part 130 is located. In addition, when the ratio (L1/L2) between L1 and the length L2 of the image-forming region along the first direction is greater than ⅓, the interference of the inherent signal in the electrical signal may be reduced. Therefore, the electrical signal on the surface of the photosensitive drum 120 may be conveniently obtained to determine whether the surface of the photosensitive drum 120 is normal, and furthermore, whether the process cartridge 100 meets expectation may be determined.

Optionally, the potential detection part 130 may be spaced apart from the image-forming region. When the potential detection part 130 is spaced apart from the image-forming region, the surfaces of the potential detection part 130 and the photosensitive drum 120 may actually form a capacitor-like structure. When the electrostatic latent image is on the image-forming region, the potential difference may be between different regions on the image-forming region. Therefore, when the image-forming region opposite to the potential detection part 130 changes from being opposite to one region on the image-forming region to another region on the image-forming region with the different potential, the potential detection part 130 may generate the electrical signal accordingly. Above-mentioned electrical signal may be related to the electrostatic latent image on the image-forming region. If an abnormality occurs on the surface of the photosensitive drum 120, the distribution of the electrostatic latent image may be abnormal, thereby affecting the property of the electrical signal. Therefore, whether the image-forming region on the surface of the photosensitive drum 120 is normal may be determined according to the electrical signal.

In an optional embodiment, as shown in FIGS. 5 and 6, the potential detection part 130 may include the scraping blade 111 and a conductive part. The scraping blade 111 may be configured to be disposed on the process cartridge 100, and the conductive part may be disposed on the scraping blade 111. Two portions of the conductive part may be the detection starting portion 131 and the detection ending portion 132, respectively. The scraping blade 111 may be configured to scrape the toner on the surface of the photosensitive drum 120, and the distance between the scraping blade 111 and the photosensitive drum 120 may be relatively close. Therefore, the potential detection part 130 may be disposed on the scraping blade 111, such that a capacitor structure may be formed between the potential detection part 130 and the surface of the photosensitive drum 120. In addition, the scraping blade 111 may be in direct contact with the photosensitive drum 120. Therefore, the potential detection part 130 may be disposed on another side of the insulating portion of the scraping blade 111 away from the image-forming region to prevent the potential detection part 130 from being electrically connected to the surface of the photosensitive drum 120, such that the potential detection part 130 may realize potential detection of the image-forming region on the surface of the photosensitive drum 120 through the capacitor structure.

Furthermore, as shown in FIG. 3, the scraping blade 111 may be the cleaning blade 111*a*. When the toner is adsorbed on the surface of the photosensitive drum 120 and after transferring is performed, the cleaning blade 111*a* may scrape off residual toner on the photosensitive drum 120. The residual toner may be stored in the waste toner bin 112, such that the image-forming region on the surface of the photosensitive drum 120 may be kept clean before the start of next printing job and may not interfere with the image-forming of next printing job.

Furthermore, as shown in FIG. 3, the scraping blade 111 may be the sealing scraping blade 111*b*. The sealing scraping blade 111*b* may be configured to seal the waste toner bin 112, which may prevent waste toner in the waste toner bin 112 from leaking out of the waste toner bin 112 to contaminate the image-forming apparatus.

It can be understood that the region, which may form the capacitor structure and capacitor-like structure on the process cartridge 100 with the image-forming region on the photosensitive drum 120, may be the region where the potential detection part 130 is disposed; and when the potential detection part 130 electrically detects the photosensitive drum 120, the photosensitive drum 120 should have been exposed by the optical scanning unit, that is, the image-forming region on the surface of the photosensitive drum 120 may already have the electrostatic latent image. Therefore, in other embodiments, if other regions of the process cartridge 100 meet above condition, the potential detection part 130 may also be disposed at other positions or regions other than the scraping blade 111.

As shown in FIGS. 1-4, the present disclosure provides an image-forming apparatus including the process cartridge 100 and the potential detection part 130 as described above. The potential detection part 130 may be disposed on the process cartridge 100.

In above image-forming apparatus, when the potential detection part 130 is installed on the process cartridge 100, the potential detection part 130 may detect the electrical signal on the image-forming region of the photosensitive drum. When the electrostatic latent image is formed on the image-forming region of the photosensitive drum 120 and passes the potential detection part 130, according to the potential difference between different regions on the image-forming region, the potential detection part 130 may obtain the electrical signal corresponding to the potential difference. In addition, the circuit itself where the potential detection part 130 is located may also have the inherent signal. The inherent signal may not change significantly as the length of the potential detection part 130 increases or decreases. Furthermore, when the maximum distance L1 along the first direction between the detection starting portion 131 and the detection ending portion 132 on the potential detection part 130 that can perform potential detection becomes larger, that is, when the maximum distance between the detection starting position and the detection ending position on the image-forming region is larger, the amplitude of the electrical signal corresponding to the potential difference obtained by the potential detection part 130 may be also larger. Therefore, the electrical signal corresponding to the potential difference obtained by the potential detection part 130 may be more obvious than the inherent signal of the circuit where the potential detection part 130 is located. In addition, when the ratio (L1/L2) between L1 and the length L2 of the image-forming region along the first direction is greater than ⅓, the interference of the inherent signal in the electrical signal may be reduced. Therefore, the electrical signal on the surface of the photosensitive drum 120 may be conveniently obtained to determine whether the surface of the photosensitive drum 120 is normal, and furthermore, whether the process cartridge 100 meets expectation may be determined.

In an optional embodiment, as shown in FIG. 8, the image-forming apparatus may further includes the image-forming control unit 301. The image-forming control unit 301 may be configured to control the image-forming apparatus to form a preset electrostatic latent image on the surface of the photosensitive drum 120 and determine whether the process cartridge 100 meets expectation based on the second electrical signal generated according to the first electrical signal outputted by the potential detection part 130. The image-forming control unit 301 may send job to form the preset electrostatic latent image on the surface of the photosensitive drum 120. At this point, the potential detection part 130 may detect the first electrical signal according to the image-forming region on the surface of the photosensitive drum 120, and the first electrical signal may be processed to form the second electrical signal. The image-forming control unit 301 may determine whether the process cartridge 100 meets expectation according to the second electrical signal.

The electrical signal may be transmitted to the image-forming apparatus main body 300.

When the process cartridge 100 has a pre-installed or installed potential detection part 130, and after the potential detection part 130 obtains the electrical signal, the electrical signal may be transmitted to the image-forming apparatus main body 300. The image-forming apparatus main body 300 may determine whether the photosensitive drum 120 is normal and whether the process cartridge 100 meets expectation according to the electrical signal.

In an optional embodiment, as shown in FIGS. 1-4 and 8, the process cartridge 100 may include a first connection part 210; the first connection part 210 may be electrically connected to the potential detection part 130; the first connection part 210 may include a first output terminal 211; and the first output terminal 211 may be configured to be electrically connected to the image-forming apparatus main body 300 to transmit the electrical signal to the image-forming apparatus main body 300 for determining whether the process cartridge 100 meets expectation. The first connection part 210 may be electrically connected to the potential detection part 130 and the image-forming apparatus main body 300, respectively, such that the electrical signal obtained by the potential detection part 130 may be directly transmitted to the image-forming apparatus main body 300. At this point, the image-forming apparatus main body 300 may determine whether the process cartridge 100 meets expectation according to the electrical signal.

For example, the first output terminal 211 may be configured to be electrically connected to the image-forming control unit 301 of the image-forming apparatus main body 300 to transmit the electrical signal to the image-forming control unit 301; and the image-forming control unit 301 may determine whether the process cartridge 100 meets expectation according to the electrical signal.

Figure 9:
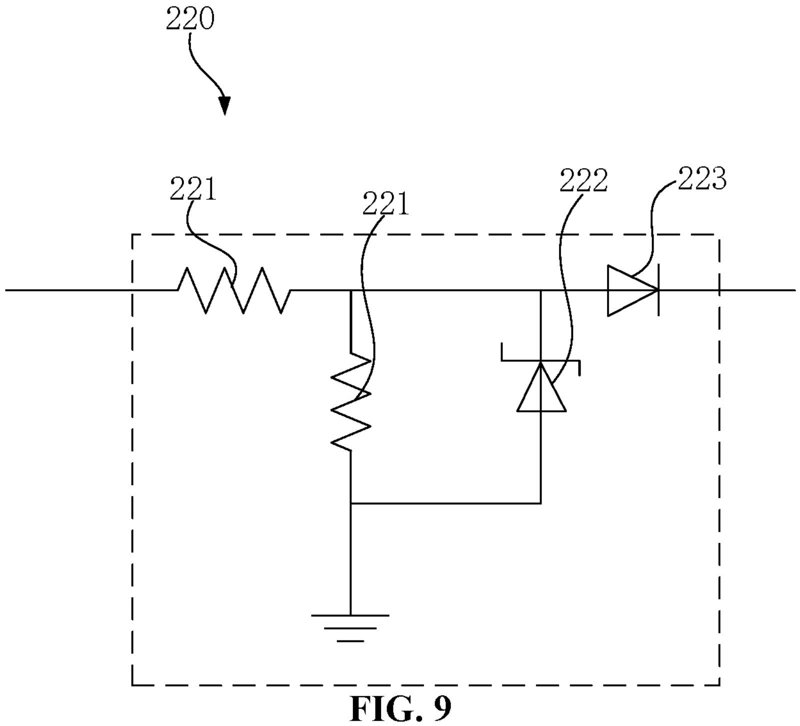
FIG. 9 illustrates a structural schematic of a signal processing module provided by exemplary embodiments of the present disclosure.

Furthermore, as shown in FIGS. 8 and 9, the process cartridge 100 may further includes a signal processing module 220. The signal processing module 220 may be disposed on the first connection part 210 and electrically connected to the first output terminal 211. The signal processing module 220 may be configured to process the signal inputted to the signal processing module 220 to obtain a processed signal; and the processed signal may be configured to determine whether the process cartridge 100 meets expectation. The electrical signal obtained by the potential detection part 130 may be processed by the signal processing module 220 to obtain an electrical signal which may be more convenient for processing or recognition by the image-forming apparatus main body 300 and may also protect circuits in the image-forming apparatus.

In an optional embodiment, the first output terminal 211 may be also configured to be electrically connected to the signal processing module 220. When the first output terminal 211 is electrically connected to the signal processing module 220, the signal processing module 220 may be configured to process the signal inputted to the signal processing module 220 to obtain a processed signal. The processed signal may be configured to determine whether the process cartridge 100 meets expectation. The signal processing module 220 may not be disposed on a storage apparatus 140. At this point, when the signal processing module 220 is electrically connected to the first output terminal 211, the signal processing module 220 may process the electrical signal to obtain an electrical signal which may be more convenient for processing or recognition by the image-forming apparatus main body 300 and may also protect circuits in the image-forming apparatus. That is, the process cartridge itself may not include the signal processing module 220. In order to protect the circuits in the image-forming apparatus, the signal processing module 220 may be additionally installed.

Furthermore, as shown in FIG. 9, the signal processing module 220 may include a voltage dividing module 221, configured to perform voltage dividing processing on the signal received by the voltage dividing module 221 to obtain a divided signal; and/or a voltage stabilizing module 222, configured to perform voltage stabilizing processing on the signal received by the voltage stabilizing module 222 to obtain a stabilized signal; and/or a rectification module 223, configured to rectify the signal received by the rectification module 223 to obtain a rectified signal. The voltage dividing module 221 may reduce the voltage of the signal transmitted to the image-forming apparatus main body 300 to prevent excessive voltage from damaging the circuits in the image-forming apparatus. The voltage stabilizing module 222 may prevent excessive voltage from damaging circuits in the image-forming apparatus. The rectification module 223 may rectify the signal and filter out a portion of the signal which cannot be processed, thereby being convenient for processing or identification by the image-forming apparatus main body 300 and also protecting the circuits in the image-forming apparatus.

It can be understood that the signal processing module 220 may process the electrical signals and protect the circuits by using at least one of the voltages dividing module 221, the voltage stabilizing module 222, and the rectifying module 223. Obviously, when the signal processing module 220 uses the voltage dividing module 221, the voltage stabilizing module 222, and the rectifying module 223 simultaneously, desirable protection effect may be achieved. In addition, the signal processing module 220 may also use other modules that may protect the circuits.

For example, as shown in FIG. 9, the voltage dividing module 221 may include at least one voltage dividing resistor. By connecting the voltage dividing resistor in series between the potential detection part 130 and the image-forming apparatus main body 300, voltage dividing function may be achieved, and the voltage of the electrical signal transmitted from the first connection part 210 to the image-forming apparatus main body may be reduced. Obviously, the voltage dividing module 221 may also be other parts or circuits capable of dividing voltage.

For example, as shown in FIG. 9, the voltage stabilizing module 222 may include a voltage stabilizing diode. One end of the voltage stabilizing diode may be connected to the first connection part 210, and another end of the voltage stabilizing diode may be connected to ground, which may stabilize the voltage and prevent excessive voltage from damaging the circuits. Obviously, the voltage stabilizing module 222 may also be other parts or circuits capable of stabilizing voltage.

For example, as shown in FIG. 9, the rectifier module 223 may include a unidirectional rectifier diode. By connecting the unidirectional rectifier diode in series between the potential detection part 130 and the image-forming apparatus main body 300, the negative voltage signal may be filtered out, which may prevent breakdown of the modules connected to the diode and protect the circuits from damage. In one embodiment, the unidirectional rectifier diode may mainly filter out the negative voltage in the electrical signal to meet requirements for the electrical signal on the main body side of the image-forming apparatus. Obviously, the rectifier module 223 may also be other parts or circuits capable of rectifying. Meanwhile, according to different requirements, the rectifier module 223 may also be configured to remove positive voltage portion of the electrical signal.

When the process cartridge 100 has a pre-installed or installed potential detection part 130, and after the potential detection part 130 obtains the electrical signal, the electrical signal may be transmitted to the image-forming apparatus main body 300. However, if a terminal for receiving above-mentioned electrical signal is newly added to the side of the image-forming apparatus main body 300 of the image-forming apparatus, the complexity and cost of the image-forming apparatus mechanism design may be increased.

In order to solve above problems, as shown in FIGS. 1-4, the present disclosure provides the process cartridge 100. The process cartridge 100 may be detachably installed in the image-forming apparatus main body 300 and may include the cartridge body 110, the photosensitive drum 120 and the potential detection part 130. The photosensitive drum 120 may be rotatably installed in the cartridge body 110. The photosensitive drum 120 may be disposed with the image-forming region that may generate the electrostatic latent image. The potential detection part 130 may be configured to detect the electrical signals on the image-forming region.

Figure 10:
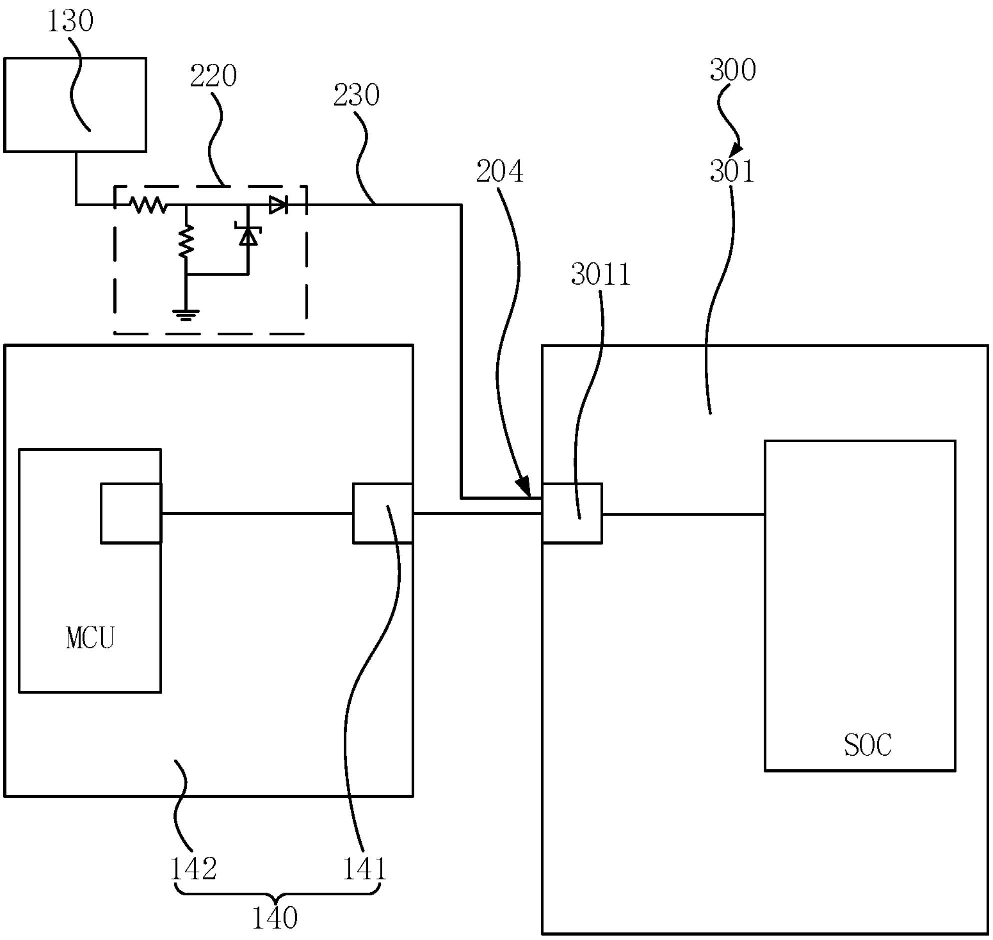
FIG. 10 illustrates an assembly schematic of a potential detection part, a storage apparatus, a second connection part and an image-forming apparatus main body provided by exemplary embodiments of the present disclosure.

Furthermore, as shown in FIG. 10, the process cartridge 100 may further include a storage apparatus 140. The storage apparatus 140 may include an electrical contact 141 which may be configured to be electrically connected to an electrical contact portion 3011 disposed on the image-forming apparatus main body 300.

Furthermore, as shown in FIG. 10, the process cartridge 100 may further include the first electrical connection part; and the first electrical connection part may include a transmission terminal 204. The transmission terminal 204 may be electrically connected to the potential detection part 130 and configured to be electrically connected to the electrical contact portion 3011. The transmission terminal 204 may be configured to obtain the electrical signals from the image-forming region on the photosensitive drum 120 of the process cartridge 100 that may generate the electrostatic latent image. The transmission terminal 204 may be configured to, when the transmission terminal 204 is electrically connected to the electrical contact portion 3011, transmit an electrical signal, generated according to the electrical signal for determining whether the process cartridge 100 meets expectation, to the electrical contact portion 3011.

In above-mentioned process cartridge 100, the electrical contact 141 of the storage apparatus 140 may be configured to be electrically connected to the electrical contact portion 3011 on the image-forming apparatus main body 300. The electrical contact 141 may also be configured to electrically connect the potential detection part 130 to the electrical contact portion 3011 through the transmission terminal 204 of the first electrical connection part. At this point, there is no need to add new contact on the side of the image-forming apparatus main body 300, and the electrical signal from the image-forming region of the photosensitive drum 120 detected by the potential detection part 130 may be transmitted to the image-forming apparatus main body 300, which may effectively reduce formation cost and design difficulty.

Practically, in some embodiments, if new contact is added to the side of the image-forming apparatus main body 300, the circuit or structure on the side of the image-forming apparatus main body 300 may need to be modified accordingly. However, original circuit and structure on the side of the image-forming apparatus main body 300 may be relatively complex, so that modifications may greatly increase the cost and difficulty of design and formation. By reusing the electrical contact portion 3011 on the side of the image-forming apparatus main body 300, the design may be effectively simplified, and the cost may be reduced. Meanwhile, due to the simplification of the circuits, the stability of the system on the side of the image-forming apparatus main body 300 may also be improved.

Optionally, in the process cartridge 100, above-mentioned first electrical connection part may be following second connection part 230, and the transmission terminal 204 may be the following second output terminal. That is, the process cartridge 100 may include the storage apparatus 140 and the second connection part 230. The storage apparatus 140 may include a substrate 142 and an electrical contact 141 electrically connected to the substrate 142. The electrical contact 141 may be configured to be electrically connected to the electrical contact portion 3011 disposed on the image-forming apparatus main body 300. The second connection part 230 may be electrically connected to the potential detection part 130. The second connection part 230 may include a second output terminal for being electrically connected to the electrical contact portion 3011.

Practically, in some embodiments, after receiving the electrical signal obtained by the potential detection part 130, the second connection part 230 may transmit the electrical signal to the image-forming apparatus main body 300 when the second output terminal is electrically connected to the electrical contact portion 3011 on the side of the image-forming apparatus main body 300. At this point, the image-forming apparatus main body 300 may determine whether the process cartridge 100 meets expectation according to the electrical signal. Therefore, the side of the image-forming apparatus main body 300 may directly receive the electrical signal transmitted by the potential detection part 130 using the electrical contact portion 3011 electrically connected to the electrical contact 141 on the storage apparatus 140; and there is no need to disposed separate electrical contact portion 3011 for receiving the electrical signal from the potential detection part 130, which may save formation cost.

In an optional embodiment, as shown in FIGS. 9 and 10, the process cartridge 100 may further include the signal processing module 220. The signal processing module 220 may be electrically connected to the second output terminal. The signal processing module 220 may be configured to process the signal inputted to the signal processing module 220 to obtain a processed signal, and the processed signal may be configured to determine whether the process cartridge 100 meets expectation. The electrical signal obtained by the potential detection part 130 may be processed by the signal processing module 220 to obtain an electrical signal which may be more convenient for processing or recognition by the image-forming apparatus main body 300 and may also protect the circuits in the image-forming apparatus.

In an optional embodiment, the second output terminal may be also configured to be electrically connected to the signal processing module 220. When the second output terminal is electrically connected to the signal processing module 220, the signal processing module 220 may be configured to process the signal inputted to the signal processing module 220 to obtain a processed signal. The processed signal may be configured to determine whether the process cartridge 100 meets expectation. The signal processing module 220 may not be disposed on the storage apparatus 140. At this point, after the signal processing module 220 is electrically connected to the second output terminal, the signal processing module 220 may process the electrical signal to obtain an electrical signal which may be more convenient for processing or recognition by the image-forming apparatus main body 300 and may also protect the circuits in the image-forming apparatus. That is, the process cartridge itself may not include the signal processing module 220. In order to protect the circuits in the image-forming apparatus, the signal processing module 220 may be additionally installed.

Figure 11:
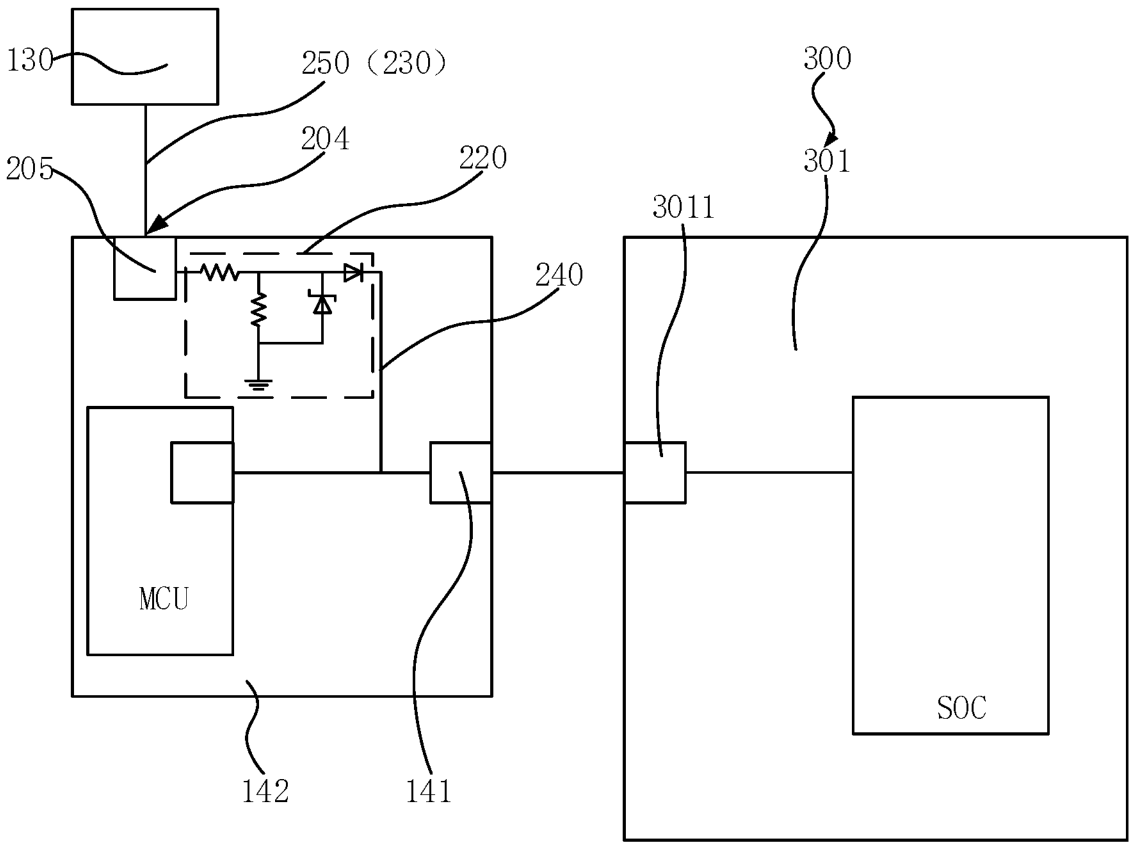
FIG. 11 illustrates an assembly schematic of a potential detection part, a storage apparatus, a second connection part, a third connection part and an image-forming apparatus main body provided by exemplary embodiments of the present disclosure.
Figure 12:
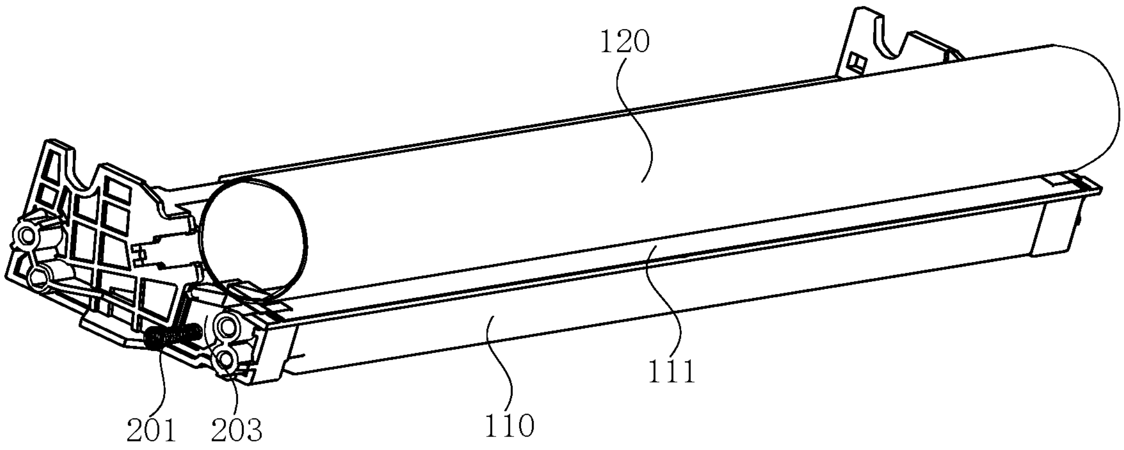
FIG. 12 illustrates another partial structural schematic of a process cartridge provided by exemplary embodiments of the present disclosure.
Figure 13:
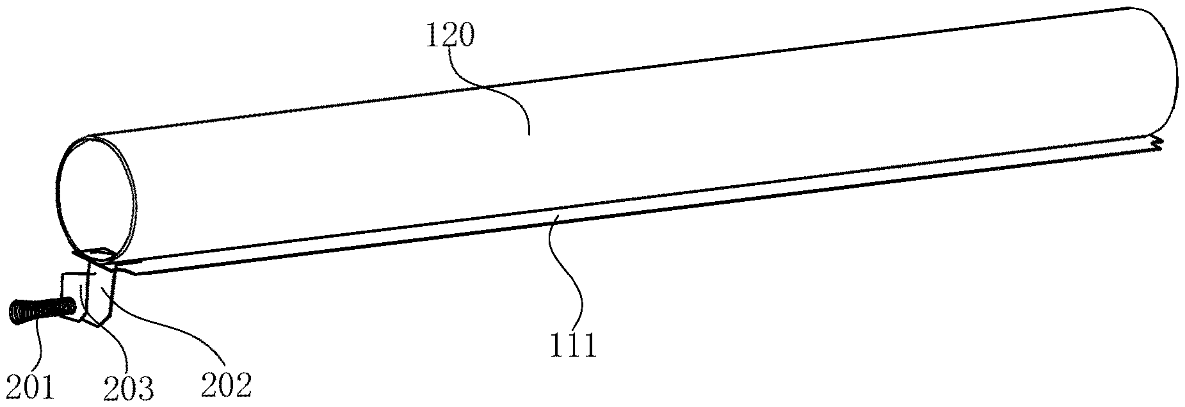
FIG. 13 illustrates another partial structural schematic of a process cartridge provided by exemplary embodiments of the present disclosure.
Figure 14:
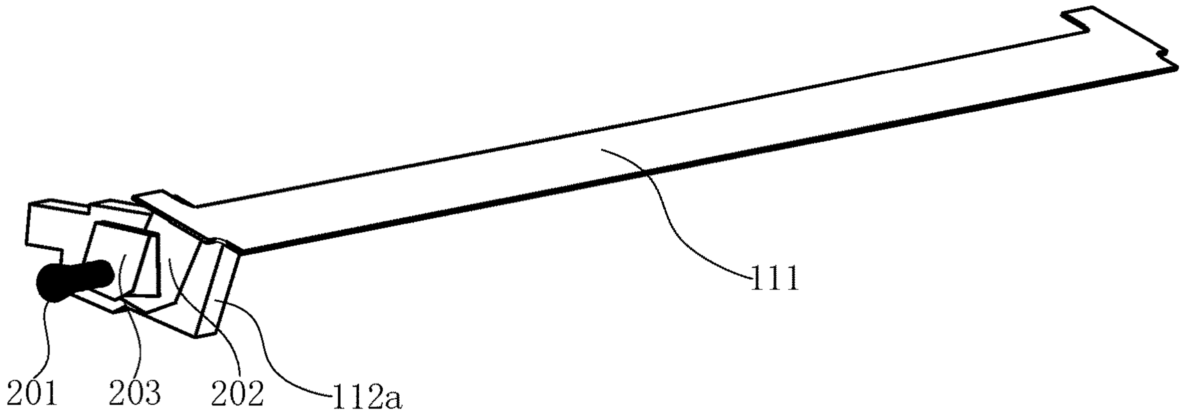
FIG. 14 illustrates another partial structural schematic of a process cartridge provided by exemplary embodiments of the present disclosure.
Figure 15:
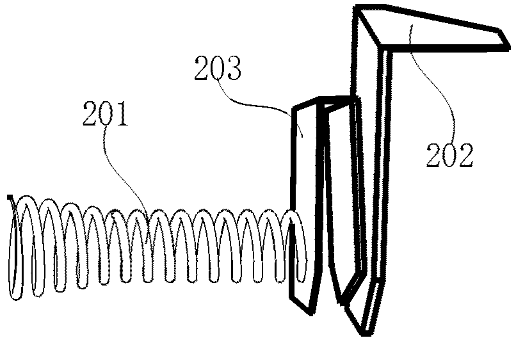
FIG. 15 illustrates an assembly schematic of a conductive elastic part, a first connection part, and a second connection part provided by exemplary embodiments of the present disclosure.

In an optional embodiment, as shown in FIG. 11, the second output terminal may be electrically connected to the electrical contact 141. That is, after the electrical signal obtained by the potential detection part 130 is received by the second connection part 230, the electrical signal may be then transmitted to the storage apparatus 140 through the second output terminal; and the electrical signal may be transmitted to the image-forming apparatus main body 300 through the electrical contact 141 on the substrate 142 of the storage apparatus 140. At this point, the image-forming apparatus main body 300 may determine whether the process cartridge 100 meets expectation according to the electrical signal.

For example, as shown in FIG. 11, the electrical contact 141 may be configured to be electrically connected to the image-forming control unit 301 of the image-forming apparatus main body 300 to transmit the electrical signal to the image-forming control unit 301; and the image-forming control unit 301 may determine whether the process cartridge 100 meets expectation according to the electrical signal.

In an optional embodiment, the process cartridge 100 may further include a storage apparatus installation portion; and the second output terminal may protrude from an outer surface of the storage apparatus installation portion. When the storage apparatus 140 is installed on the storage apparatus installation portion of the process cartridge 100, since the second output terminal protrudes from the outer surface of the storage apparatus installation portion, the storage apparatus 140 may be in contact with the second output terminal to be abutted against with each other, which may ensure stable connection between the second output terminal and the storage apparatus 140 and improve the stability of electrical signal transmission.

Optionally, the second output terminal may be made of a conductive elastic material or a conductive material. An elastic member may be between the second output terminal and the storage apparatus installation portion. When the storage apparatus 140 is installed on the storage apparatus installation portion, the storage apparatus 140 may exert force on the second output terminal or the elastic member made of the conductive elastic material. The elastic force provided by the second output terminal or the elastic member which is made of the conductive elastic material may make the second output terminal and the storage apparatus 140 to be tightly abutted with each other, such that the connection between the second output terminal and the storage apparatus 140 may be tighter, and the electrical conduction effect may be more stable.

Optionally, as shown in FIGS. 12-15, the second connection part 230 may further includes a connection assembly and a conductive elastic member 201. The connection assembly may extend from the inside of the waste toner bin 112 of the process cartridge 100 to the outside of the waste toner bin 112. One end of the connection assembly inside the waste toner bin 112 may be configured to be electrically connected to the potential detection part 130, and another end of the connection assembly outside the waste toner bin 112 may be configured to be electrically connected to the conductive elastic member 201. The conductive elastic member 201 may be outside the waste toner bin 112. The conductive elastic member 201 may be electrically connected to the second output terminal and configured to output the electrical signal obtained by the potential detection part 130.

Furthermore, as shown in FIGS. 3 and 12-15, the cartridge body 110 may include the waste toner bin 112. A sealing member 112*a*, such as a sealing sponge, may be disposed on one side of the waste toner bin 112. The connection assembly may include a first connection member 202 and a second connection member 203. One end of the first connection member 202 may be between the potential detection part 130 and the sealing sponge in the waste toner bin 112, and another end of the first connection member 202 may be electrically connected to the second connection member 203. The second connection member 203 may extend from the inside of the waste toner bin 112 to the outside of the waste toner bin 112 and may be electrically connected to the conductive elastic member 201. The second connection member 203 may be a U-shaped structure, which may match the end structure of the waste toner bin 112 and improve the installation stability of the second connection member 203. The conductive elastic member 201 may be a conductive spring, a conductive elastic piece, or the like.

Furthermore, the end surface of the process cartridge 100 may be provided with an installation hole. The conductive elastic member 201 may pass through the installation hole and protrude from the end face of the process cartridge, and the storage apparatus installation portion may be at the end face of the process cartridge 100. The diameter of the installation hole may gradually increase along a direction closer to the outer surface of the storage apparatus installation portion. At least a part of the conductive elastic member 201 may have a tapered structure which matches the installation hole to facilitate positioning of the conductive elastic member 201.

Figure 16:
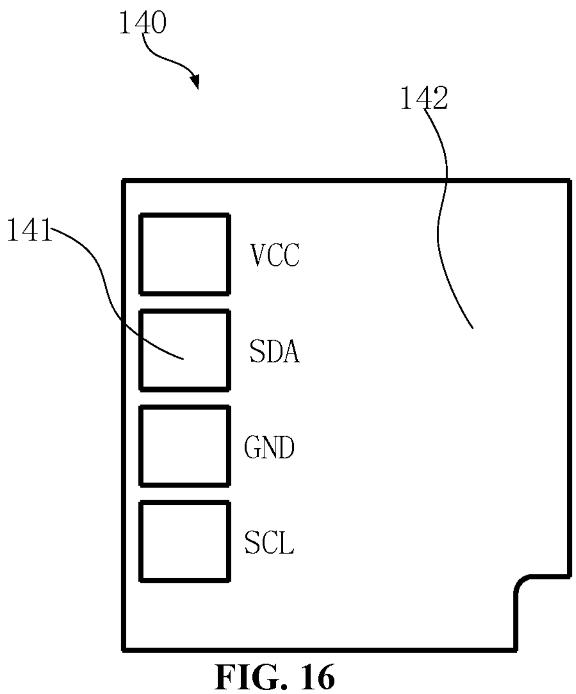
FIG. 16 illustrates a front view of a storage apparatus provided by exemplary embodiments of the present disclosure.
Figure 17:
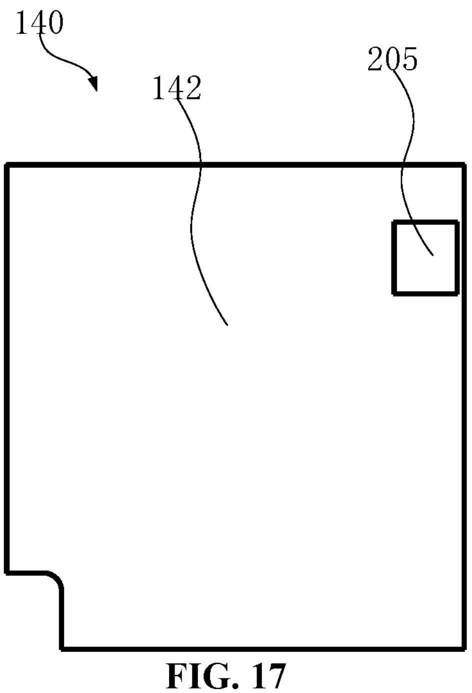
FIG. 17 illustrates a back view of a storage apparatus provided by exemplary embodiments of the present disclosure.

In an optional embodiment, as shown in FIGS. 11, 16 and 17, the storage apparatus 140 may further include the substrate 142, and the substrate 142 may be disposed with an electrical connection terminal 205. When the storage apparatus 140 is installed on the storage apparatus installation portion, the electrical connection terminal 205 may be electrically connected to the second output terminal. When the storage apparatus 140 is installed on the storage apparatus installation portion of the process cartridge 100, the electrical connection terminal 205 on the storage apparatus 140 may be in a direct or indirect contact with the second output terminal; and the second output terminal may be electrically connected to the electrical contact 141 through the electrical connection terminal 205 to form a circuit for transmitting the electrical signal obtained by the potential detection part 130. For example, the electrical connection terminal 205 may be electrically connected to the electrical contact 141.

It can be understood that the electrical connection terminal 205 may not be disposed on the storage apparatus 140, but the second output terminal may be electrically connected to the electrical contact 141 through an external wire, a cable, or the like.

In an optional embodiment, as shown in FIGS. 16 and 17, the electrical connection terminal 205 and the electrical contact 141 may be respectively disposed on different surfaces of the substrate 142. The potential detection part 130 may detect the image-forming region on the surface of the photosensitive drum 120 to obtain the electrical signal. Therefore, the electrical signal may be transmitted from one side of the process cartridge 100 to the electrical connection terminal 205 on the storage apparatus 140 via the second connection part 230. In addition, the electrical contact 141 may need to be connected to the image-forming apparatus main body 300 outside the process cartridge 100. Therefore, according to coordination requirements, the electrical connection terminal 205 and the electrical contact 141 may be respectively disposed on different surfaces of the substrate 142. The electrical signal generated by the potential detection part 130 may be conveniently received and transmitted to the image-forming apparatus main body 300, and the electrical connection structure may be simplified to reduce cost.

It can be understood that, depending on different requirements or design considerations, the electrical connection terminal 205 and the electrical contact 141 may also be disposed on same surface of the substrate 142.

In addition, the second output terminal may also be directly or indirectly electrically connected to the electrical contact portion 3011 without passing the storage apparatus 140.

In an optional embodiment, as shown in FIGS. 9 and 10, the image-forming apparatus main body 300 may be disposed with the image-forming control unit 301. The image-forming control unit 301 may be electrically connected to the electrical contact portion 3011, and the electrical contact 141 may be configured to be electrically connected to the electrical contact portion 3011, thereby being electrically connected to the image-forming control unit 301. The storage apparatus 140 may have two states. When the storage apparatus 140 is in the first state, communication data may be sent to the image-forming control unit 301 through the electrical contact 141; and when the storage apparatus 140 is in the second state, transmission of communication data sent to the image-forming control unit 301 through the electrical contact 141 may be prohibited. The state of the storage apparatus 140 may be switched to implement different functions. When the storage apparatus 140 is switched to the first state, the electrical contact 141 may communicate with the image-forming control unit 301, and when the storage apparatus 140 is switched to the second state, the electrical contact 141 may be prohibited from communicating with the image-forming control unit 301. At this point, it is convenient for the image-forming control unit 301 to identify the electrical signal and perform determination on the electrical signal.

In an optional embodiment, when the storage apparatus 140 is in the second state, the electrical contact 141 may be configured to be at a high resistance state. At this point, the electrical contact 141 and the image-forming control unit 301 cannot transmit communication data, which may be convenient for the image-forming control unit 301 to identify and determine the electrical signal.

It can be understood that when the electrical contact 141 is electrically connected to the second output terminal, if the electrical contact 141 is configured to be at the high resistance state, the microcontroller unit (MCU) circuit part of the storage apparatus 140 may be actually configured to be at the high resistance state, such that communication data cannot be transferred between the MCU and the image-forming control unit 301. The electrical contact 141 itself may be used as a conductor or pin and may still transmit the electrical signal from the second output terminal to the electrical contact portion 3011 on the image-forming apparatus main body 300.

As shown in FIGS. 1-4, 11 and 18, the present disclosure provides the storage apparatus 140, which may be installed on the process cartridge 100. The process cartridge 100 may be detachably installed on the image-forming apparatus main body 300 and include the electrical contact 141. The electrical contact 141 may be configured to be electrically connected to the electrical contact portion 3011 disposed on the image-forming apparatus main body 300.

Furthermore, the storage apparatus 140 may further include a second electrical connection portion 240. The second electrical connection portion 240 may include an electrical connection terminal 205. The second electrical connection portion 240 may be configured to be electrically connected to the potential detection part 130 and the electrical contact portion 3011, respectively. The electrical connection terminal 205 may be configured to, when the second electrical connection portion 240 is electrically connected to the potential detection part 130, obtain the electrical signal from the image-forming region on the photosensitive drum 120 of the process cartridge 100 that can generate the electrostatic latent image. In addition, the electrical connection terminal 205 may be configured to, when the second electrical connection portion 240 is electrically connected to the electrical contact portion 3011, transmit the electrical signal, generated according to the electrical signal for determining whether the process cartridge 100 meets expectation, to the electrical contact portion 3011. The potential detection part 130 may be disposed on the process cartridge 100 and configured to detect the electrical signal on the image-forming region.

The electrical contact 141 of above-mentioned storage apparatus 140 may be configured to be electrically connected to the electrical contact portion 3011 on the image-forming apparatus main body 300, such that the potential detection part 130 may be also electrically connected to the electrical contact portion 3011 through the electrical connection terminal 205 of the second electrical connection portion 240 on the storage apparatus 140. At this point, there is no need to add new contact on the side of the image-forming apparatus main body 300. That is, the electrical signal detected by the electro-detection part 130 in the image-forming region of the photosensitive drum 120 may be transmitted to the image-forming apparatus main body 300, which may effectively reduce formation cost and design difficulty. Moreover, the second electrical connection portion 240 may be also integrated on the storage apparatus 140, which may have high integration degree and more suitable arrangement.

It can be understood that the quantity of the electrical contacts 141 on the storage apparatus 140 to be electrically connected to the electrical contact portion 3011 of the image-forming apparatus main body 300 may be set according to requirements. For example, the quantity of the electrical contact 141 may be one; and at this point, the electrical connection terminal 205 may be electrically connected to the electrical contact 141. Or the quantity of the electrical contacts 141 may be two, where one electrical contact 141 may be a terminal used by the storage apparatus 140 itself for data communication with the image-forming apparatus main body 300, and another electrical contact may be electrically connected to the electrical connection terminal 205. Next, two electrical contacts 141 may be electrically connected through conductive parts such as wires, conductive tape, conductive elastic sheets and/or the like and may be electrically connected to the electrical contact portion 3011 simultaneously.

Figure 18:
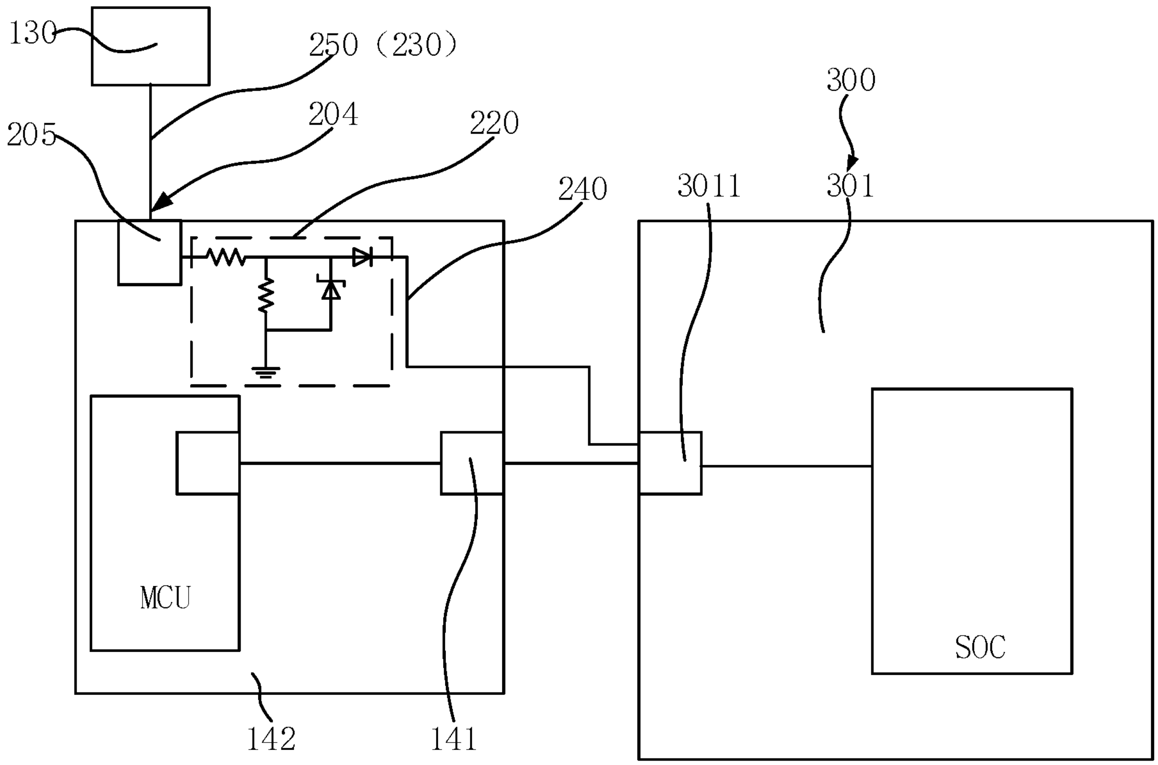
FIG. 18 illustrates an assembly schematic of a potential detection part, a storage apparatus, a second connection part, a third connection part and an image-forming apparatus main body provided by exemplary embodiments of the present disclosure.

In an optional embodiment, as shown in FIGS. 9, 11 and 18, the storage apparatus 140 may further include the signal processing module 220. The signal processing module 220 may be electrically connected to the electrical connection terminal 205. The signal processing module 220 may be configured to process the signal inputted to the signal processing module 220 to obtain a processed signal, and the processed signal may be configured to determine whether the process cartridge 100 meets expectation. The electrical signal obtained by the potential detection part 130 may be processed by the signal processing module 220 to obtain an electrical signal which may be more convenient for processing or recognition by the image-forming apparatus main body 300 and may also protect the circuits in the image-forming apparatus.

In an optional embodiment, the electrical connection terminal 205 may also be configured to be electrically connected to the signal processing module 220. When the second output terminal 205 is electrically connected to the signal processing module 220, the signal processing module 220 may be configured to process the signal inputted to the signal processing module 220 to obtain a processed signal. The processed signal may be configured to determine whether the process cartridge 100 meets expectation. The signal processing module 220 may not be disposed on the storage apparatus 140. At this point, after the signal processing module 220 is electrically connected to the second output terminal, the signal processing module 220 may process the electrical signal to obtain an electrical signal which may be more convenient for processing or recognition by the image-forming apparatus main body 300 and may also protect the circuits in the image-forming apparatus. That is, the process cartridge itself may not include the signal processing module 220. In order to protect the circuits in the image-forming apparatus, the signal processing module 220 may be additionally installed.

In an optional embodiment, as shown in FIG. 11, the electrical connection terminal 205 may be electrically connected to the electrical contact 141. At this point, the electrical signal obtained by the potential detection part 130 may be also transmitted to the image-forming apparatus main body 300 through the electrical contact 141, which may simplify the structure.

In an optional embodiment, as shown in FIGS. 16 and 17, the electrical connection terminal 205 and the electrical contact 141 may be respectively disposed on different surfaces of the substrate 142. The potential detection part 130 may detect the image-forming region on the surface of the photosensitive drum 120 to obtain the electrical signal. Therefore, the electrical signal may be transmitted from one side of the process cartridge 100 to the electrical connection terminal 205 on the storage apparatus 140 via the second connection part 230. In addition, the electrical contact 141 may need to be connected to the image-forming apparatus main body 300 outside the process cartridge 100. Therefore, according to coordination requirements, the electrical connection terminal 205 and the electrical contact 141 may be respectively disposed on different surfaces of the substrate 142. The electrical signal generated by the potential detection part 130 may be conveniently received and transmitted to the image-forming apparatus main body 300, and the electrical connection structure may be simplified to reduce cost.

In an optional embodiment, as shown in FIGS. 11 and 18, the image-forming apparatus main body 300 may be disposed with the image-forming control unit 301. The image-forming control unit 301 may be electrically connected to the electrical contact portion 3011, and the electrical contact 141 may be configured to be electrically connected to the electrical contact portion 3011, thereby being electrically connected to the image-forming control unit 301. The storage apparatus 140 may have two states. When the storage apparatus 140 is in the first state, communication data may be sent to the image-forming control unit 301 through the electrical contact 141; and when the storage apparatus 140 is in the second state, transmission of communication data sent to the image-forming control unit 301 through the electrical contact 141 may be prohibited. The state of the storage apparatus 140 may be switched to implement different functions. When the storage apparatus 140 is switched to the first state, the electrical contact 141 may communicate with the image-forming control unit 301, and when the storage apparatus 140 is switched to the second state, the electrical contact 141 may be prohibited from communicating with the image-forming control unit 301. At this point, it is convenient for the image-forming control unit 301 to identify the electrical signal and perform determination on the electrical signal.

It can be understood that when the electrical contact 141 is electrically connected to the electrical connection terminal 205, if the electrical contact 141 is configured to be at the high resistance state, the MCU circuit part of the storage apparatus 140 may be actually configured to be at the high resistance state, such that communication data cannot be transferred between the MCU and the image-forming control unit 301. The electrical contact 141 itself may be used as a conductor or pin and may still transmit the electrical signal from the electrical connection 205 to the electrical contact portion 3011 on the image-forming apparatus main body 300.

As shown in FIGS. 1-4, 11 and 18, the present disclosure provides the process cartridge 100. The process cartridge 100 may include the cartridge body 110, the photosensitive drum 120 and the potential detection part 130. The photosensitive drum 120 may be rotatably installed on the cartridge body 110. The photosensitive drum 120 may be disposed with the image-forming region that can generate the electrostatic latent image. The potential detection part 130 may be configured to detect the electrical signal on the image-forming region.

Furthermore, the process cartridge 100 may further include the storage apparatus 140 as mentioned above, and the storage apparatus 140 may be electrically connected to the potential detection part 130.

In the process cartridge 100, the electrical contact 141 of above-mentioned storage apparatus 140 may be configured to be electrically connected to the electrical contact portion 3011 on the image-forming apparatus main body 300, such that the potential detection part 130 may be also electrically connected to the electrical contact portion 3011 through the electrical connection terminal 205 of the second electrical connection portion 240 on the storage apparatus 140. At this point, there is no need to add new contact on the side of the image-forming apparatus main body 300. That is, the electrical signal detected by the electro-detection part 130 in the image-forming region of the photosensitive drum 120 may be transmitted to the image-forming apparatus main body 300, which may effectively reduce formation cost and design difficulty. Moreover, the second electrical connection portion 240 may be also integrated on the storage apparatus 140, which may have high integration degree and more suitable arrangement.

In an optional embodiment, as shown in FIGS. 11 and 18, the process cartridge 100 may further include a third electrical connection part 250. The potential detection part 130 may be electrically connected to the electrical connection terminal 205 through the third electrical connection part 250.

Obviously, the second electrical connection portion 240 may also be directly electrically connected to the potential detection part 130.

In an optional embodiment, the cartridge body 110 may further include the storage apparatus installation portion. The third electrical connection part 250 may at least partially protrude from the outer surface of the storage apparatus installation portion. When the storage apparatus 140 is installed on the storage apparatus installation portion of the process cartridge 100, since the third electrical connection part 250 protrudes from the outer surface of the storage apparatus installation portion, the storage apparatus 140 may be in contact with the third electrical connection part 250 to be abutted against with each other, which may ensure stable connection between the third electrical connection part 250 and the storage apparatus 140 and improve the stability of electrical signal transmission.

Optionally, the third electrical connection part 250 may include the transmission terminal 204 for being electrically connected to the electrical connection terminal 205. The transmission terminal 204 may at least partially protrude from the outer surface of the storage apparatus installation portion. The transmission terminal 204 may be made of a conductive elastic material; and the transmission terminal 204 may be made of a conductive material, and an elastic member may be between the transmission terminal 204 and the storage apparatus installation portion. When the storage apparatus 140 is installed on the storage apparatus installation portion, the storage apparatus 140 may exert force on the transmission terminal 204 or the elastic member of the conductive elastic material. The elastic force provided by the conductive elastic material of the transmission terminal 204 or the elastic member may make the transmission terminal 204 and the storage apparatus 140 to be tightly abutted with each other, such that the connection between the transmission terminal 204 and the storage apparatus 140 may be tighter and the electrical conduction effect may be more stable.

Optionally, as shown in FIGS. 12-15, the third electrical connection part 250 may further include the connection assembly and the conductive elastic member 201. The connection assembly may extend from the inside of the waste toner bin 112 of the process cartridge 100 to the outside of the waste toner bin 112. One end of the connection assembly inside the waste toner bin 112 may be configured to be electrically connected to the potential detection part 130, and another end of the connection assembly outside the waste toner bin 112 may be configured to be electrically connected to the conductive elastic member 201. The conductive elastic member 201 may be outside the waste toner bin 112. The conductive elastic member 201 may be electrically connected to the electrical connection terminal 205 for outputting the electrical signal obtained by the potential detection part 130.

The present disclosure provides an image-forming apparatus, including the process cartridge 100 as described above.

As shown in FIGS. 1-3, 19 and 20, the present disclosure provides a connection apparatus 260 which may be installed on the process cartridge 100. The process cartridge 100 may be detachably disposed on the image-forming apparatus main body 300 and include a receiving terminal 206 and the transmission terminal 204 electrically connected to the receiving terminal 206. The receiving terminal 206 may be configured to be electrically connected to the potential detection part 130, such that the electrical signal, which may detected by the potential detection part 130 on the image-forming region of the photosensitive drum 120 in the process cartridge 100 capable of generating the electrostatic latent image, may be obtained. The transmission terminal 204 may be configured to be electrically connected to the electrical contact portion 3011 disposed on the image-forming apparatus main body 300. The electrical contact portion 3011 may be configured to be connected to the electrical contact 141 on the storage apparatus 140 installed on the process cartridge 100. The transmission terminal 204 may be configured to obtain the electrical signal and transmit an electrical signal, generated according to the electrical signal for determining whether the process cartridge 100 meets expectation, to the electrical contact portion 3011.

Above-mentioned connection apparatus 260 may transmit the electrical signal detected by the potential detection part 130 to the electrical contact portion 3011. In addition, the electrical contact portion 3011 may be also electrically connected to the electrical contact 141 on the storage apparatus 140 on the process cartridge 100, such that the electrical contact portion 3011 disposed on the image-forming apparatus main body 300 may perform data communication with the electrical contact 141 of the storage apparatus 140 and may also receive the electrical signal detected by the potential detection part 130. Therefore, by disposing above-mentioned connection apparatus 260, there is no need to provide new terminal on the side of the image-forming apparatus main body 300, which may effectively reduce the design and formation difficulty on the side of the image-forming apparatus main body 300.

Figure 20:
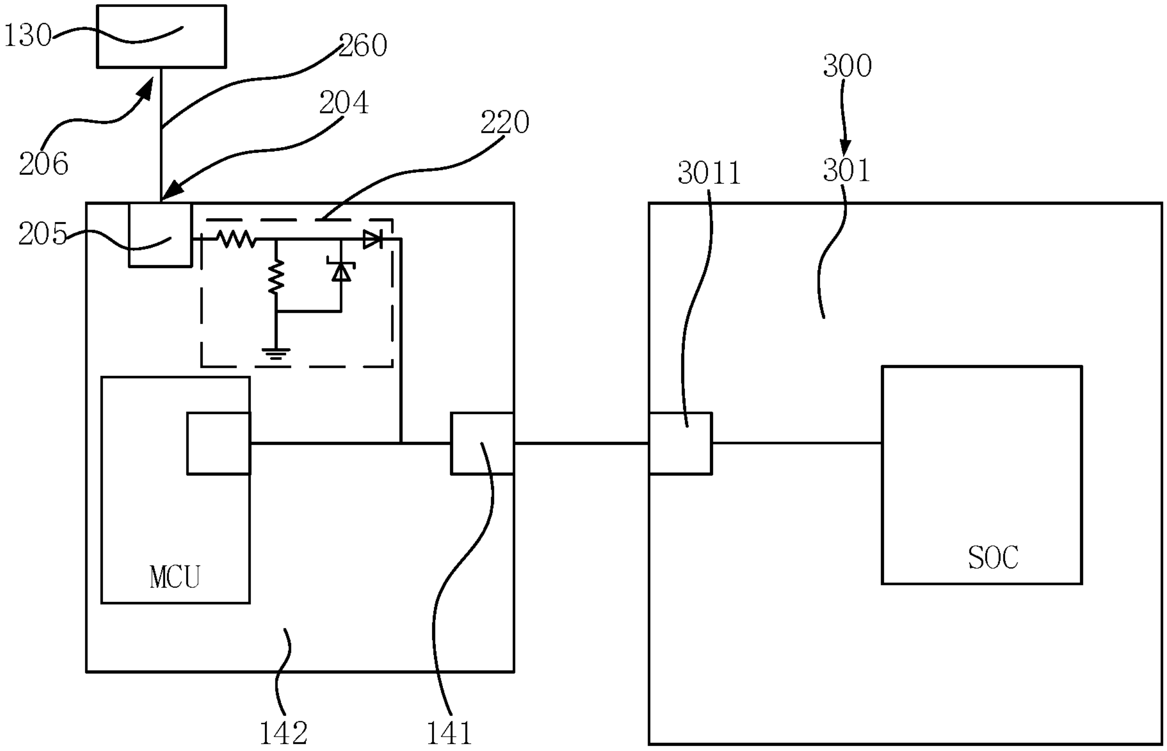
FIG. 20 illustrates an assembly schematic of a potential detection part, a connection part, a storage apparatus, and an image-forming apparatus main body provided by exemplary embodiments of the present disclosure.

In an optional embodiment, as shown in FIG. 20, the transmission terminal 204 may be electrically connected to the electrical contact 141. That is, after receiving the electrical signal obtained by the potential detection part 130, the receiving terminal 206 may transmit the electrical signal to the electrical contact 141 of the storage apparatus 140 through the transmission terminal 204, and the electrical contact 141 on the storage apparatus 140 may transmit the electrical signal to the image-forming apparatus main body 300. At this point, the image-forming apparatus main body 300 may determine whether the process cartridge 100 meets expectation according to the electrical signal; and the electrical signal obtained by the potential detection part 130 may be also transmitted to the electrical contact portion 3011 of the image-forming apparatus main body 300 through the electrical contact 141, which may simplify the assembly structure.

In an optional embodiment, as shown in FIG. 20, the storage apparatus 140 may include the substrate 142. The substrate 142 may be disposed with the electrical connection terminal 205, and the transmission terminal 204 may be electrically connected to the electrical connection terminal 205. At this point, the connection apparatus 260 may be electrically connected to the image-forming apparatus main body 300 through the storage apparatus 140.

It can be understood that the electrical connection terminal 205 and the transmission terminal 204 may also be a same part of the connection apparatus 260, that is, the transmission terminal 204 may be directly disposed on the storage apparatus 140.

Figure 19:
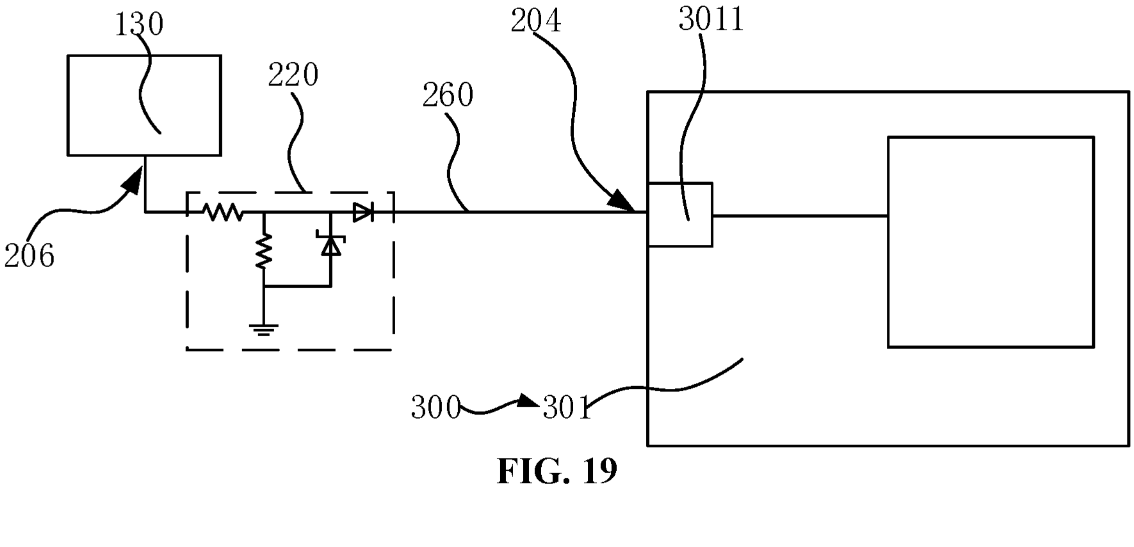
FIG. 19 illustrates an assembly schematic of a potential detection part, a connection part, and an image-forming apparatus main body provided by exemplary embodiments of the present disclosure.

In an optional embodiment, as shown in FIGS. 9 and 19, the connection apparatus 260 may include the signal processing module 220. The signal processing module 220 may be electrically connected to the transmission terminal 204. The signal processing module 220 may be configured to process the signal inputted to the signal processing module 220 to obtain the processed signal, and the processed signal may be configured to determine whether the process cartridge 100 meets expectation. At this point, after the potential detection part detects the electrical signal, the potential detection part may transmit the electrical signal to the signal processing module 220 through the transmission terminal 204, and the signal processing module 220 may process the electrical signal to obtain an electrical signal which may be more convenient for processing or recognition by the image-forming apparatus main body 300 and may also protect the circuits in the image-forming apparatus.

In an optional embodiment, as shown in FIG. 9 and FIG. 19, the receiving terminal 206 may be also configured to be electrically connected to the signal processing module 220. The signal processing module 220 may be configured to process the signal inputted to the signal processing module 220 to obtain the processed signal, and the processed signal may be configured to determine whether the process cartridge 100 meets expectation. The signal processing module 220 may also be installed subsequently. When the signal processing module 220 is electrically connected to the receiving terminal 206, the signal processing module 220 may process the electrical signal to obtain an electrical signal which may be more convenient for processing or recognition by the image-forming apparatus main body 300 and may also protect the circuits in the image-forming apparatus.

The present disclosure provides an assembly including the potential detection part 130 and above-mentioned connection apparatus 260. The potential detection part 130 may be electrically connected to the receiving terminal 206. The potential detection part 130 may be configured to detect the electrical signal on the image-forming region of the photosensitive drum 120 in the process cartridge 100, where the electrostatic latent image may be generated at the image-forming region.

Above-mentioned assembly may transmit the electrical signal detected by the potential detection part 130 to the electrical contact portion 3011, and the electrical contact portion 3011 may be also electrically connected to the electrical contact 141 on the storage apparatus 140 on the process cartridge 100. In such way, the electrical contact portion 3011 disposed on the image-forming apparatus main body 300 may perform data communication with the electrical contact 141 of the storage apparatus 140 and may also receive the electrical signal detected by the potential detection part 130. Therefore, by disposing above-mentioned connection apparatus 260, there is no need to provide new terminal on the side of the image-forming apparatus main body 300, which may effectively reduce the design and formation difficulty on the side of the image-forming apparatus main body 300.

As shown in FIGS. 1-3 and 19-20, the present disclosure provides the process cartridge 100. The process cartridge 100 may include the cartridge body 110, the photosensitive drum 120 and a connection part setting region. The photosensitive drum 120 may be rotatably installed on the cartridge body 110. The photosensitive drum 120 may be disposed with the image-forming region capable of generating the electrostatic latent image. The connection part setting region may be configured to set above-mentioned connection apparatus 260.

Above-mentioned process cartridge 100 may transmit the electrical signal detected by the potential detection part 130 to the electrical contact portion 3011, and the electrical contact portion 3011 may be also electrically connected to the electrical contact 141 on the storage apparatus 140 of the process cartridge 100. In such way, the electrical contact portion 3011 disposed on the image-forming apparatus main body 300 may perform data communication with the electrical contact 141 of the storage apparatus 140 and may also receive the electrical signal detected by the potential detection part 130. Therefore, by disposing above-mentioned connection apparatus 260, there is no need to provide new terminal on the side of the image-forming apparatus main body 300, which may effectively reduce the design and formation difficulty on the side of the image-forming apparatus main body 300.

In an optional embodiment, as shown in FIGS. 19 and 20, the process cartridge 100 may further include the storage apparatus 140; the storage apparatus 140 may include the electrical contact 141; and the transmission terminal 204 may be electrically connected to the electrical contact 141. The electrical signal may be transmitted from the transmission terminal 204 to the electrical contact 141 of the storage apparatus 140; and the electrical signal may be then transmitted to the image-forming apparatus main body 300 from the electrical contact 141 on the storage apparatus 140. The image-forming apparatus main body 300 may determine whether the process cartridge 100 meets expectation according to the electrical signal. At this point, the electrical signal obtained by the potential detection part 130 may be also transmitted to the electrical contact portion 3011 of the image-forming apparatus main body 300 through the electrical contact 141, which may simplify the assembly structure.

In an optional embodiment, as shown in FIG. 19, the image-forming apparatus main body 300 may be disposed with the image-forming control unit 301. The image-forming control unit 301 may be electrically connected to the electrical contact portion 3011, and the electrical contact 141 may be configured to be electrically connected to the electrical contact portion 3011, thereby being electrically connected to the image-forming control unit 301. The storage apparatus 140 may have two states. When the storage apparatus 140 is in the first state, communication data may be sent to the image-forming control unit 301 through the electrical contact 141; and when the storage apparatus 140 is in the second state, transmission of communication data sent to the image-forming control unit 301 through the electrical contact 141 may be prohibited. The state of the storage apparatus 140 may be switched to implement different functions. When the storage apparatus 140 is switched to the first state, the electrical contact 141 may communicate with the image-forming control unit 301, and when the storage apparatus 140 is switched to the second state, the electrical contact 141 may be prohibited from communicating with the image-forming control unit 301. At this point, it is convenient for the image-forming control unit 301 to identify the electrical signal and perform determination on the electrical signal.

It can be understood that when the electrical contact 141 is electrically connected to the transmission terminal 204, if the electrical contact 141 is configured to be at the high resistance state, the MCU circuit part of the storage apparatus 140 may be actually configured to be at the high resistance state, such that communication data cannot be transferred between the MCU and the image-forming control unit 301. The electrical contact 141 itself may be used as a conductor or pin and may still transmit the electrical signal from the transmission terminal 204 to the electrical contact portion 3011 on the image-forming apparatus main body 300.

In an optional embodiment, the cartridge body 110 may further include the storage apparatus installation portion. The storage apparatus installation portion may be configured to install the storage apparatus 140, and the transmission terminal 204 may at least partially protrude from the outer surface of the storage apparatus installation portion. When the storage apparatus 140 is installed on the storage apparatus installation portion of the process cartridge 100, since the transmission terminal 204 protrudes from the outer surface of the storage apparatus installation portion, the storage apparatus 140 may be in contact with the transmission terminal 204 to be abutted against with each other, which may ensure stable connection between the transmission terminal 204 and the storage apparatus 140 and improve the stability of electrical signal transmission.

In an optional embodiment, as shown in FIG. 20, the storage apparatus 140 may further include the substrate 142. The substrate 142 may be also disposed with the electrical connection terminal 205. When the storage apparatus 140 is installed on the storage apparatus installation portion, the electrical connection terminal 205 may be electrically connected to the transmission terminal 204. When the storage apparatus 140 is installed on the storage apparatus installation portion of the process cartridge 100, the electrical connection terminal 205 on the storage apparatus 140 may be in a direct or indirect contact with the transmission terminal 204; and the transmission terminal 204 may be electrically connected to the electrical contact 141 through the electrical connection terminal 205 to form a circuit for transmitting the electrical signal obtained by the potential detection part 130. For example, the electrical connection terminal 205 may be electrically connected to the electrical contact 141.

It can be understood that the electrical connection terminal 205 may not be disposed on the storage apparatus 140, but the transmission terminal 204 and the electrical contact 141 may be electrically connected through an external wire, a cable, or the like.

In an optional embodiment, as shown in FIGS. 16 and 17, the electrical connection terminal 205 and the electrical contact 141 may be respectively disposed on different surfaces of the substrate 142. The electrical connection terminal 205 and the electrical contact 141 may be respectively disposed on different surfaces of the substrate 142; and the electrical signal generated by the potential detection part 130 may be conveniently received and transmitted to the image-forming apparatus main body 300, thereby simplifying the electrical connection structure and reducing cost.

It can be understood that, depending on different requirements or design considerations, the electrical connection terminal 205 and the electrical contact 141 may also be disposed on a same surface of the substrate 142.

In an optional embodiment, the process cartridge 100 may include a connection part installation region. The connection part installation region may be configured to install the third connection part. When the third connection part is installed in the connection part installation region, the third connection part may be electrically connected to the potential detection part 130. The third connection part may include a third output terminal. The third output terminal may be configured to be electrically connected to the image-forming apparatus main body 300, such that the electrical signal may be transmitted to the image-forming apparatus main body 300 according to the detection result of the potential detection part 130 for determining whether the process cartridge 100 meets expectation. By installing the third connection part in the connection part installation region on the process cartridge 100 and electrically connecting the third connection part with the potential detection part 130, the process cartridge 100 may transmit the electrical signal obtained by the potential detection part 130 through the third connection part. The third output terminal of the third connection part may transmit the electrical signal obtained by the potential detection part 130 to the image-forming apparatus main body 300 after the process cartridge 100 is installed on the image-forming apparatus main body 300, such that the image-forming apparatus main body 300 may be configured to determine whether the process cartridge 100 meets expectation according to the electrical signal.

Practically, in some embodiments, when the third connection part is installed in the connection part installation region, the third connection part may at least meet following installation requirements. The third connection part may be electrically connected to the potential detection part 130; and the position of the third output terminal on the process cartridge 100 may need to correspond to one electrical contact on the image-forming apparatus main body 300, such that when the process cartridge 100 is installed on the image-forming apparatus main body 300, the third output terminal may be in contact with the electrical contact portion to form electrical connection.

It can be understood that adding the third connection part to the process cartridge 100 may increase assembly process. According to cost or feasibility considerations, after other parts of the process cartridge 100 are assembled, the connection part installation region may be reserved on the process cartridge 100, and then the third connection part may be installed in the connection part installation region.

For example, the process cartridge 100 may be disposed with an exposed region, that is, the connection part installation region, and the size of the region may match the size of the potential detection part 130; and the connection part installation region may be disposed in the process cartridge 100 and configured to install the potential detection part 130 or provide a prompt that the potential detection part 130 can be installed.

Furthermore, the process cartridge 100 may be disposed with a recess or a protrusion at the connection part installation region; or the process cartridge 100 may be disposed with a concave or convex edge surrounding the connection part installation region; or the process cartridge 100 may be disposed with a label portion in the connection part installation region, where the label portion may be text, a symbol, a pattern or the like to indicate specific installation location.

In addition, the process cartridge 100 may be a detachable structure. Certain parts of the process cartridge 100 may be removed to facilitate the installation of the third connection part.

In an optional embodiment, the storage apparatus 140 and the connection part installation region may be installed on the process cartridge 100. The connection part installation region may be configured to install a fourth connection part; and the fourth connection part may include a fourth output terminal. The storage apparatus 140 may include the substrate 142 and the electrical contact 141 electrically connected to the substrate 142. The electrical contact 141 may be configured to be electrically connected to the electrical contact portion 3011 disposed on the image-forming apparatus main body 300. When the fourth connection part is installed in the connection part installation region, the fourth connection part may be electrically connected to the potential detection part 130, and the fourth output terminal may be electrically connected to the electrical contact 141. By installing the fourth connection part in the connection part installation region on the process cartridge 100 and electrically connecting the fourth connection part with the potential detection part 130, the process cartridge 100 may transmit the electrical signal obtained by the potential detection part 130 through the fourth connection part. The fourth output terminal of the fourth connection part may be electrically connected to the electrical contact portion 3011. After the process cartridge 100 is installed in the image-forming apparatus main body 300, the electrical signal obtained by the potential detection part 130 may be transmitted to the image-forming apparatus main body 300 through electrical connection with the electrical contact portion 3011, such that the image-forming apparatus main body 300 may be configured to determine whether the process cartridge 100 meets expectation according to the electrical signal.

Practically, in some embodiments, when the fourth connection part is installed in the connection part installation region, the fourth connection part may need to meet at least following installation requirements. The fourth connection part may be electrically connected to the potential detection part 130; and the fourth output terminal may be electrically connected to the electrical contact portion 3011.

It can be understood that adding the fourth connection part to the process cartridge 100 may increase assembly process, cost or feasibility considerations. According to cost or feasibility considerations, after other parts of the process cartridge 100 are assembled, the connection part installation region may be reserved on the process cartridge 100, and then the fourth connection part may be installed in the connection part installation region.

In addition, the process cartridge 100 may be a detachable structure, and certain parts of the process cartridge 100 may be removed to facilitate the installation of the fourth connection part.

Whether the process cartridge meets expectation may be determined according to the electrical signal.

The present disclosure provides a detection method, applied to the image-forming apparatus, which may include following exemplary steps: sending an image-forming instruction containing a preset test pattern; according to the image-forming instruction, obtaining the second electrical signal generated according to the first electrical signal which is generated on the surface of the photosensitive drum 120 in the process cartridge 100; determining whether the second electrical signal corresponds to the preset test pattern; and according to the determination result, determining whether the process cartridge 100 meets expectation.

According to above-mentioned detection method, according to the image-forming instruction sent, the surface of the photosensitive drum 120 may form an electrostatic latent image corresponding to the preset test pattern. At this point, the first electrical signal may be obtained according to the image-forming region on the surface of the photosensitive drum 120, and the first electrical signal may be transmitted or processed to generate the second electrical signal. Therefore, according to whether the information of the second electrical signal corresponds to the preset test pattern, whether the process cartridge 100 meets expectation may be determined.

Optionally, above-mentioned detection method may be applied to above-mentioned image-forming apparatus. During the test, the image-forming apparatus may include the potential detection part 130 which is a part of the process cartridge 100; or the potential detection part 130 may be installed on the process cartridge 100; or the potential detection part 130 may be disposed separately from the process cartridge 100 and detect the image-forming region on the surface of the photosensitive drum 120 to generate the first electrical signal.

In an optional embodiment, determining whether the second electrical signal corresponds to the preset test pattern may include following exemplary steps.

The second electrical signal may include a plurality of voltage values; the quantity information of voltage values exceeding the first preset threshold among the plurality of voltage values may be determined; the quantity information may be compared with the second preset threshold to generate a comparison result; and when the comparison result is inconsistent, the determination result may be that the second electrical signal does not correspond to the preset test pattern.

After obtaining the second electrical signal, the plurality of voltage values in the second electrical signal may be compared with the first preset threshold; the quantity of voltage values exceeding the first preset threshold may be calculated to obtain quantity information; the quantity information may be compared with the second preset threshold; and when the comparison result is inconsistent, the second electrical signal may not correspond to the preset test pattern.

It can be understood that when the quantity information is consistent with the comparison result of the second preset threshold, it may determine that the process cartridge 100 meets expectation; or further determination may be performed.

It can be understood that the second preset threshold may be a point value or a range value. When the second preset threshold is a range value, the comparison result is consistent if the quantity information is above range value.

Optionally, after the image-forming region of the photosensitive drum is exposed, if exposure intensities for different regions of the image-forming region are different, different regions with potential differences may be formed on the image-forming region.

It can be understood that the voltage value may be continuously obtained according to the test pattern, for example, as the photosensitive drum 120 rotates after exposure. When the potential detection part 130 changes from being opposite to one region on the image-forming region to being opposite to another region on the image-forming region with different potential, that is, when the potential detection part 130 passes the junction of two regions with different potentials in the image-forming region, obtained voltage value may increase or decrease.

It can be understood that, according to different comparison manners, the second preset threshold may adopt different forms of values. For example, when comparing the quantity information with the second preset threshold, the quantity of the plurality of voltage values of the second electrical signal exceeding the first preset threshold may be directly configured to be compared with the second preset threshold. Or the plurality of voltage values exceeding the first preset threshold obtained when the potential detection part 130 passes the junction of two regions with different potentials on the image-forming region may be considered as a data set; and the quantity of data sets included in the second electrical signal obtained may be calculated according to the test pattern, and then the quantity of data sets may be compared with the second preset threshold. Practically, in some embodiments, the quantity of data sets may have a corresponding relationship with the quantity of electrostatic latent image regions on the image-forming region.

Figure 21:
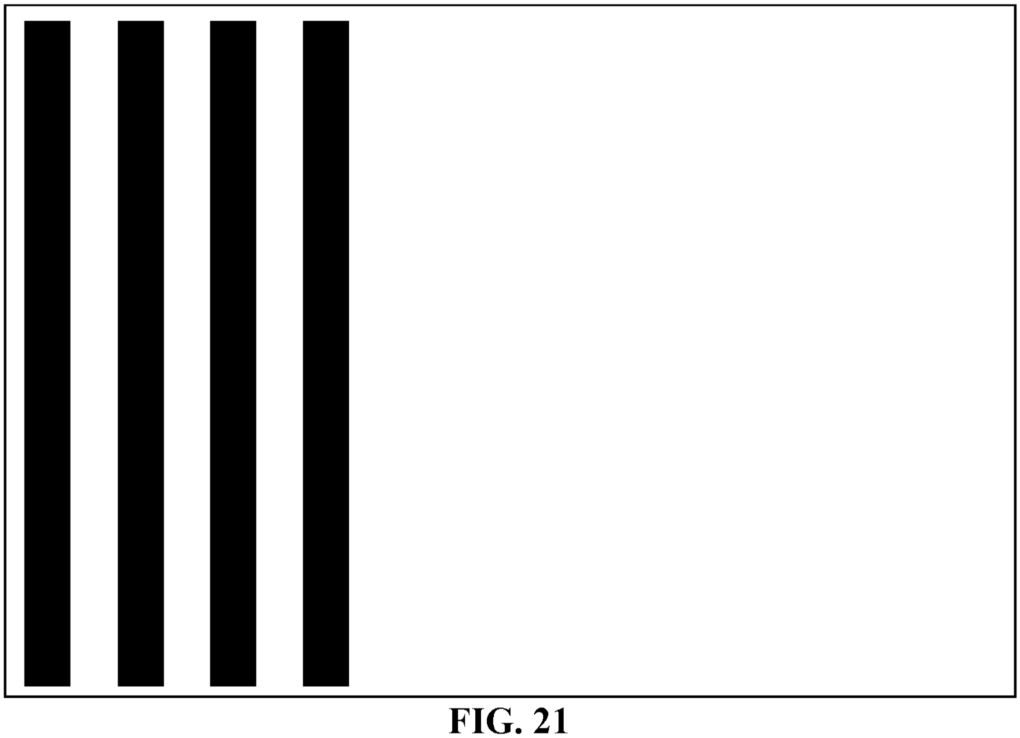
FIG. 21 illustrates a schematic of a test pattern provided by exemplary embodiments of the present disclosure.

In an optional embodiment, as shown in FIG. 21, the test pattern may include four dark region blocks configured at intervals, and the rest may be light regions. For example, when the exposure operation is performed according to the test pattern, a first electrostatic latent image region corresponding to the dark region in the test pattern and a second electrostatic latent image region corresponding to the light region may be formed on the photosensitive drum 120. As the photosensitive drum 120 rotates, the electrosensitive part 130 may sequentially pass the second electrostatic latent image region, the first electrostatic latent image region, the second electrostatic latent image region, the first electrostatic latent image region, the second electrostatic latent image region, the first latent electrostatic image region, the second latent electrostatic image region, the first latent electrostatic image region, and the second latent electrostatic image region. Correspondingly, electrical signals detected by the potential detection part 130 may respectively correspond to above-mentioned electrostatic latent image regions. When the potential detection part 130 passes the first electrostatic latent image region or the second electrostatic latent image, the potential detection part 130 may detect the first voltage. When the potential detection part 130 passes the junction (e.g., boundary) from the first latent electrostatic image region to the second latent electrostatic image region, the potential detection part 130 may detect the second voltage. When the potential detection part 130 passes the junction (e.g., boundary) from the second latent electrostatic image region to the first latent electrostatic image region, the potential detection part 130 may detect the third voltage. The second voltage and the third voltage may have different polarities. The first voltage, the second voltage and the third voltage may be signals directly detected by the potential detection part.

In order to more accurately determine whether the process cartridge 100 meets expectation, the image-forming apparatus may be disposed with a detection circuit for detecting the signal detected by the potential detection part 130. Since the detection circuit itself has certain inherent signal, the first electrical signal obtained by detecting the voltage may include the first voltage, second voltage, third voltage and inherent signal which are mentioned above. For example, the inherent signal may be superimposed on the first voltage, the second voltage, and the third voltage, respectively. In addition, in order to ensure detection accuracy, the detection circuit may detect the electrical signal detected by the potential detection part multiple times. Therefore, the first electrical signal may include a plurality of first voltages, a plurality of second voltages, and a plurality of third voltages.

During actual detection process, the image-forming apparatus may also process detected first electrical signal to obtain the second electrical signal. For example, the signal processing module 220 may be configured to perform a voltage dividing processing, a voltage stabilizing processing, and/or a rectifying processing on the first electrical signal to obtain the second electrical signal. For example, the first electrical signal may be rectified through the signal processing module 220 to remove the third voltage contained in the first electrical signal.

Figure 22:
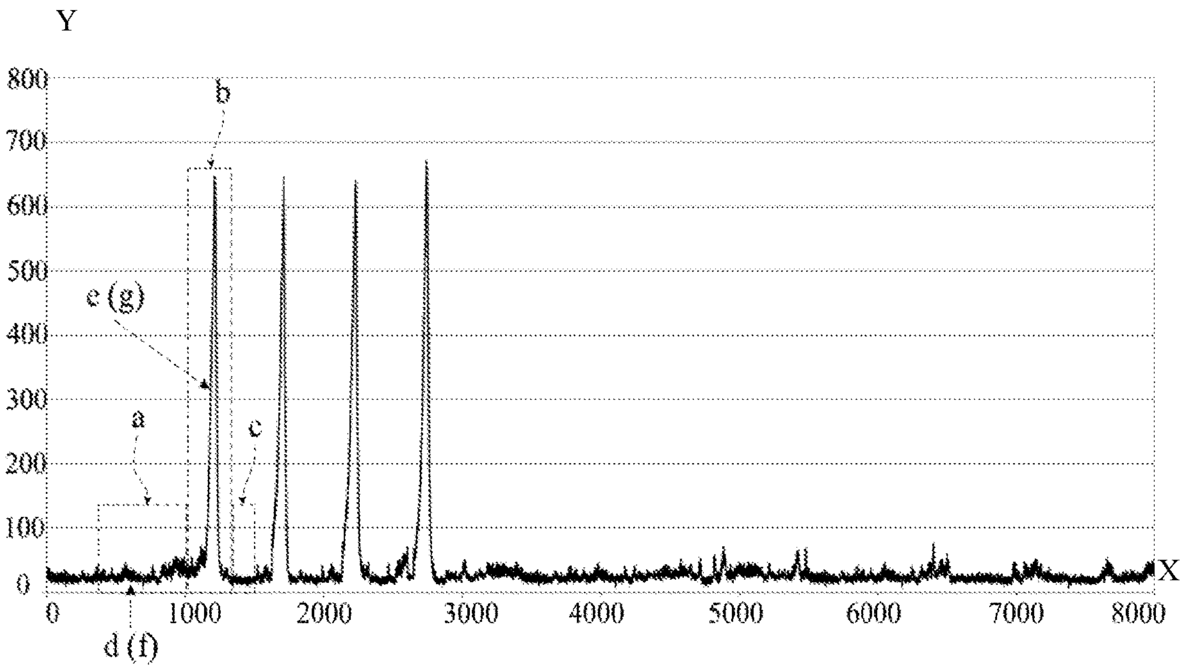
FIG. 22 illustrates a graph formed according to a second voltage value provided by exemplary embodiments of the present disclosure.

For example, as shown in FIG. 21, after the photosensitive drum 120 is exposed, the potential detection part 130 may be opposite to the photosensitive drum 120 and sequentially pass each electrostatic latent image region on the photosensitive drum 120. For example, when the image-forming instruction with the test pattern as shown in FIG. 21 is sent, the first electrostatic latent image region corresponding to the black region and the second electrostatic latent image region corresponding to the white region in the test pattern may be formed on the photosensitive drum 120. As the photosensitive drum 120 rotates, the electrosensitive part 130 may sequentially pass the second electrostatic latent image region, the first electrostatic latent image region, the second electrostatic latent image region, the first electrostatic latent image region, the second electrostatic latent image region, the first latent electrostatic image region, the second latent electrostatic image region, the first latent electrostatic image region, and the second latent electrostatic image region. When the potential detection part 130 is initially opposite to the second electrostatic latent image region, the potential detection part 130 may detect a plurality of first voltages which may be stable values or have small fluctuations. Meanwhile, the inherent signal of the detection circuit may be also superimposed on the first voltage, which may form a curve as shown at the beginning of FIG. 22, for example, the curve section a in FIG. 22. In FIG. 22, the vertical axis (i.e., Y axis) may be the voltage value; and the horizontal axis (i.e., X axis) may be the sequence number for obtaining the voltage value.

Subsequently, the potential detection part 130 may pass the junction (e.g., boundary) of the second latent electrostatic image region and the first latent electrostatic image region. At this point, the potential detection part may detect a plurality of second voltages which may be greater than the first voltages. In addition, as the potential detection part 130 changes from being opposite to the second latent electrostatic image region to being opposite to the first latent electrostatic image region, the second voltage may first increase and then decrease. Meanwhile, the inherent signal of the detection circuit may be superimposed on the second voltage, forming the first wave peak as shown in FIG. 22, for example, the curve section b in FIG. 22.

Subsequently, the potential detection part 130 may pass the junction (e.g., boundary) of the first latent electrostatic image region and the second latent electrostatic image region. At this point, the potential detection part may detect the third voltage which may be less than the first voltage. In addition, as the potential detection part 130 changes from being opposite to the first electrostatic latent image region to being opposite to the second electrostatic latent image region, the third voltage may first decrease and then increase. However, by configuring the signal processing module 220 to process the first electrical signal, the third voltage may be removed. Meanwhile, the inherent signal of the detection circuit may be superimposed to form a curve similar to the first voltage as shown in FIG. 22, for example, the curve section c in FIG. 22.

Subsequently, the potential detection part 130 may also sequentially pass the second latent electrostatic image region, the first latent electrostatic image region, the second latent electrostatic image region, the first latent electrostatic image region, the second latent electrostatic image region, and the first latent electrostatic image region, the second electrostatic latent image region; and a curve similar to the first wave peak and its corresponding two sides may be formed as shown in FIG. 22.

Referring to FIG. 22, when determining whether the second electrical signal corresponds to the preset test pattern, whether there is a voltage value exceeding the first preset threshold may be first determined, and a plurality of consecutive voltage values exceeding the first preset threshold may be regarded as a data set. Next, whether the quantity of data sets in the second electrical signal is same as the second preset threshold may be determined. The quantity of data sets in the second electrical signal is the quantity of peaks in FIG. 22. The second preset threshold may be the quantity of black regions in the test pattern. If the quantity of data sets in the second electrical signal is not consistent as the second preset threshold, the determination result may be that the second electrical signal does not correspond to the preset test pattern.

Obviously, the quantity of black regions in the test pattern may also be set to other numbers, and other colors except black color may also be used; and two adjacent regions in the test pattern may also use a same color with different concentrations, as long as a potential difference is between the different regions when the electrostatic latent image is formed on the photosensitive drum according to the test pattern.

In an optional embodiment, determining whether the second electrical signal corresponds to the preset test pattern may include that when the comparison result between the quantity information and the second preset threshold is consistent, it further determines that, compared to the preset timing starting point, whether the generation time of the voltage value in the second electrical signal exceeding the first preset threshold meets requirements, and when the generation time of the voltage value exceeding the first preset threshold meets requirements, it determines that the second electrical signal may correspond to the preset test pattern; and/or when the comparison result between the quantity information and the second preset threshold is consistent, it further determines that compared to the preset position starting point, whether the generation position information of the voltage value in the second electrical signal exceeding the first preset threshold meets requirements, and when the generation position information of the voltage value exceeding the first preset threshold meets requirements, it determines that the second electrical signal may correspond to the preset test pattern.

The preset timing starting point may be the time point when the image-forming instruction containing the preset test pattern is sent or may be such time point plus a certain time; and may be the time point when the optical scanning unit emits the light beam, a certain time point after the light beam is emitted, or a certain time point before the light beam is emitted.

Optionally, after taking a certain time point as the preset timing starting point, when the voltage value exceeding the first preset threshold in the second electrical signal is obtained, the time difference between such voltage value and the preset timing starting point may be determined to be the generation time of such voltage value. For example, as shown in FIG. 22, the horizontal axis of the coordinate system is the sequence number for obtaining the voltage value, and the time interval for obtaining the voltage value is a unit time interval. If a point d of the voltage value curve is used as the preset timing starting point and the voltage value exceeding the first preset threshold is at a point e, the generation time of voltage value e compared to the preset timing starting point may be obtained by multiplying the difference between the abscissa of the point e and the abscissa of the point d with the unit time interval. Obviously, above example may illustrate the relationship between the preset timing starting point and obtained time point of the voltage value exceeding the first preset threshold in the second electrical signal, which may not indicate that obtaining the time difference from the preset timing starting point is only above example. Practically, in some embodiments, if the preset timing start point is a certain time point when the voltage value is obtained, when the voltage value in the second electrical signal exceeding the first preset threshold is obtained, the generation time of above-mentioned voltage value may also be obtained according to the time difference between current time and the preset timing starting point.

The preset position starting point may be the preset timing starting point. Subsequently, according to the unit time interval, the voltage values may be collected multiple times to form a voltage value sequence. The voltage values collected in sequence may have corresponding sequence numbers. For example, the sequence number of the voltage value collected passing one unit time interval after the preset position starting point is 1. Therefore, when the voltage value exceeding the first preset threshold is obtained, the sequence number of such voltage value may be obtained simultaneously. Such sequence number may be the generation position information of such voltage value in the voltage value sequence and may represent the position of this voltage value in above voltage value sequence.

Optionally, as shown in FIG. 22, the horizontal axis of the coordinate system may be the sequence number for obtaining the voltage value, and the time interval for obtaining the voltage value may be the unit time interval. If a point f of the voltage value curve is used as the starting point of the preset position and a voltage value exceeding the first preset threshold is at a point g, the generation position information of such voltage value compared to the preset position starting point may be obtained according to the difference between the abscissa coordinate of the point g and the abscissa of the point f, and the generation position information may be determined. Point e and point g in the voltage value curve may be a same point or different points; and point f and point d may be a same point or different points.

When the comparison result between the quantity information and the second preset threshold is consistent, further determination may be performed. According to the property that the voltage value has generation time, the generation time of the voltage value exceeding the first preset threshold may be compared with the preset test pattern. If above-mentioned generation time of the voltage value exceeding the first preset threshold meets requirements, it determines that the second electrical signal may correspond to the preset test pattern. At this point, determination accuracy may be improved to reduce error.

In addition, according to the generation position information among the plurality of generated voltage values, the generation position information of the voltage value exceeding the first preset threshold may be compared with the preset test pattern. If the generation position information of the voltage value exceeding the first preset threshold meets requirements, it determines that the second electrical signal may correspond to the preset test pattern, which may also improve determination accuracy and reduce error.

It can be understood that when further determination is performed, the determination basis may be at least one of the generation time and the generation position information of the voltage value. Obviously, if determination is performed according to the generation time and the generation position information of the voltage value simultaneously, determination accuracy may be higher.

In an optional embodiment, before determining the quantity information of the voltage values exceeding the first preset threshold among the plurality of voltage values, the detection method may include determining that, compared to the preset position starting point, the generation position information of the first voltage value in the second electrical signal exceeding the first preset threshold meets requirements.

That is, before starting to determine whether the quantity information of the voltage values exceeding the first preset threshold among the plurality of voltage values meets expectation, whether the generation position information of the first voltage value exceeding the first preset threshold meets requirements may be first determined. If the requirements are not met, it directly determines that the second electrical signal may not correspond to the preset test pattern, thereby improving determination efficiency.

The present disclosure provides an image-forming apparatus, including the image-forming control unit 301. The image-forming control unit 301 may be configured to perform exemplary steps of above-mentioned detection method.

Above-mentioned image-forming apparatus may send the image-forming instruction through the image-forming control unit 301, such that the electrostatic latent image corresponding to the preset test pattern may be formed on the surface of the photosensitive drum 120. At this point, the first electrical signal may be obtained according to the image-forming region on the surface of the photosensitive drum 120, and the first electrical signal may be transmitted or processed to generate the second electrical signal. Therefore, the image-forming control unit 301 may determine whether the process cartridge 100 meets expectation according to whether the information of the second electrical signal corresponds to the preset test pattern.

Compared with the existing technology, the technical solutions provided by the present disclosure may achieve at least the following beneficial effects.

In the present disclosure, the maximum distance along the first direction between the orthographic projections of the detection starting portion and the detection ending portion on the image-forming region of the potential detection part is L1, and the length of the image-forming region along the first direction is L2. By setting L1/L2>⅓, when the potential detection part is on the process cartridge and detects the electrical signal on the image-forming region, the electrical signal obtained by the potential detection part through the image-forming region may have a larger amplitude than the inherent signal of the circuit of the potential detection part itself, which may further reduce the interference caused by the inherent signal of the circuit of the potential detection part itself. Therefore, the electrical signal on the surface of the photosensitive drum may be easily detected and obtained to determine whether the surface of the photosensitive drum is normal.

Above are only optional embodiments of the present disclosure and are not intended to limit the present disclosure. For those skilled in the art, the present disclosure may have various modifications and changes. Any modifications, equivalent replacements, improvements and the like made in the spirit and principle of the present disclosure shall be included in the protection scope of the present disclosure.

What is claimed is:

1. A process cartridge, detachably installed in an image-forming apparatus main body, comprising:

a cartridge body;

a photosensitive drum, rotatably installed at the cartridge body, wherein the photosensitive drum is configured with an image-forming region capable of generating an electrostatic latent image; and a potential detection part, configured to detect an electrical signal on the image-forming region, wherein:

the potential detection part includes a detection starting portion and a detection ending portion; the detection starting portion and the detection ending portion respectively correspond to a detection starting position and a detection ending position of a detectable region of the potential detection part along a first direction; a maximum distance along the first direction between orthographic projections of the detection starting portion and the detection ending portion on the image-forming region is L1; a length of the image-forming region along the first direction is L2; the first direction is in parallel with an axis direction of the photosensitive drum; and L1/L2>1/3.

2. The process cartridge according to claim 1, wherein:

the electrical signal includes a first electrical signal; the potential detection part is configured to generate the first electrical signal corresponding to preset test pattern information; and the first electrical signal is configured to determine whether the process cartridge meets expectation; or the electrical signal includes a first electrical signal; the potential detection part is configured to generate the first electrical signal corresponding to preset test pattern information; the first electrical signal is configured to generate a second electrical signal different from the first electrical signal; and the second electrical signal is configured to determine whether the process cartridge meets expectation.

3. The process cartridge according to claim 1, wherein:

the potential detection part is spaced apart from the image-forming region, and the electrical signal is a voltage signal.

4. The process cartridge according to claim 3, wherein:

the cartridge body further includes a scraping blade, wherein the scraping blade includes an insulating portion; a side of the insulating portion is in contact with a surface of the image-forming region; and the potential detection part is disposed on another side of the insulating portion away from the image-forming region.

5. The process cartridge according to claim 1, wherein:

the potential detection part includes a strip-shaped conductive strip; or the potential detection part includes at least two potential detection sub-units disposed to be spaced apart from each other.

6. The process cartridge according to claim 1, further including:

a first connection part, wherein the first connection part is electrically connected to the potential detection part and includes a first output terminal; and the first output terminal is configured to be electrically connected to the image-forming apparatus main body, such that an electrical signal for determining whether the process cartridge meets expectation is transmitted to the image-forming apparatus main body.

7. The process cartridge according to claim 6, wherein:

the first output terminal is configured to be electrically connected to a signal processing module; the signal processing module is configured to process an electrical signal inputted to the signal processing module to obtain a processed signal; and the processed signal is configured to determine whether the process cartridge meets expectation; or the process cartridge further includes a signal processing module; the signal processing module is electrically connected to the first output terminal; the signal processing module is configured to process an electrical signal inputted to the signal processing module to obtain a processed signal; and the processed signal is configured to determine whether the process cartridge meets expectation.

8. The process cartridge according to claim 1, further including:

a storage apparatus and a connection part, wherein the storage apparatus includes a substrate and an electrical contact electrically connected to the substrate; the electrical contact is configured to be electrically connected to an electrical contact portion disposed on the image-forming apparatus main body; the connection part is electrically connected to the potential detection part; and the connection part includes an output terminal configured to be electrically connected the electrical contact portion.

9. The process cartridge according to claim 8, wherein:

the output terminal is electrically connected to the electrical contact.

10. The process cartridge according to claim 9, further including:

a storage apparatus installation portion, wherein the output terminal protrudes from an outer surface of the storage apparatus installation portion.

11. The process cartridge according to claim 10, wherein:

the substrate is further disposed with an electrical connection terminal electrically connected to the electrical contact; and when the storage apparatus is installed on the storage apparatus installation portion, the electrical connection terminal is electrically connected to the output terminal.

12. The process cartridge according to claim 11, wherein:

the electrical connection terminal and the electrical contact are respectively disposed on different surfaces of the substrate.

13. The process cartridge according to claim 8, wherein:

the output terminal is configured to be electrically connected to a signal processing module; the signal processing module is configured to process an electrical signal inputted to the signal processing module to obtain a processed signal; and the processed signal is configured to determine whether the process cartridge meets expectation; or the process cartridge further includes a signal processing module; the signal processing module is electrically connected to the output terminal; the signal processing module is configured to process an electrical signal inputted to the signal processing module to obtain a processed signal; and the processed signal is configured to determine whether the process cartridge meets expectation.

14. A process cartridge, detachably installed in an image-forming apparatus main body, comprising:

a cartridge body; and a photosensitive drum, rotatably installed at the cartridge body, wherein the photosensitive drum is disposed with an image-forming region capable of generating an electrostatic latent image, wherein:

the cartridge body includes a potential detection part setting region configured to dispose a potential detection part;

when the potential detection part is installed at the potential detection part setting region, the potential detection part is configured to detect an electrical signal on the image-forming region; and the potential detection part setting region includes a first region corresponding to a detection starting portion of the potential detection part and a second region corresponding to a detection ending portion of the potential detection part; a maximum distance along a first direction between orthographic projections of the first region and the second region on the imaging area is L1, and a length of the image-forming region along the first direction is L2, wherein L1/L2>1/3; and the first direction is in parallel with an axis direction of the photosensitive drum.

15. The process cartridge according to claim 14, wherein:

the potential detection part setting region is spaced apart from the image-forming region, such that the potential detection part is spaced apart from the image-forming region after being installed at the potential detection part setting region; and the electrical signal is a voltage signal.

16. The process cartridge according to claim 14, further including:

a first connection part, wherein when the potential detection part is installed at the potential detection part setting region, the first connection part is electrically connected to the potential detection part and includes a first output terminal; and the first output terminal is configured to be electrically connected to the image-forming apparatus main body, such that an electrical signal for determining whether the process cartridge meets expectation is transmitted to the image-forming apparatus main body.

17. The process cartridge according to claim 16, wherein:

the first output terminal is configured to be electrically connected to a signal processing module; the signal processing module is configured to process an electrical signal inputted to the signal processing module to obtain a processed signal; and the processed signal is configured to determine whether the process cartridge meets expectation; or the process cartridge further includes a signal processing module; the signal processing module is electrically connected to the first output terminal; the signal processing module is configured to process an electrical signal inputted to the signal processing module to obtain a processed signal; and the processed signal is configured to determine whether the process cartridge meets expectation.

18. The process cartridge according to claim 14, wherein:

a storage apparatus and a connection part, wherein the storage apparatus includes a substrate and an electrical contact electrically connected to the substrate; the electrical contact is configured to be electrically connected to an electrical contact portion disposed on the image-forming apparatus main body; when the potential detection part is installed at the potential detection part setting region, the connection part is electrically connected to the potential detection part; and the connection part includes an output terminal configured to be electrically connected the electrical contact portion.

19. The process cartridge according to claim 18, wherein:

the output terminal is configured to be electrically connected to a signal processing module; the signal processing module is configured to process an electrical signal inputted to the signal processing module to obtain a processed signal; and the processed signal is configured to determine whether the process cartridge meets expectation; or the process cartridge further includes a signal processing module; the signal processing module is electrically connected to the output terminal; the signal processing module is configured to process an electrical signal inputted to the signal processing module to obtain a processed signal; and the processed signal is configured to determine whether the process cartridge meets expectation.

20. A potential detection part, configured to be disposed on a process cartridge, wherein:

when the potential detection part is installed on the process cartridge, the potential detection part is configured to detect an electrical signal on an image-forming region of a photosensitive drum, wherein:

the potential detection part includes a detection starting portion and a detection ending portion; the detection starting portion and the detection ending portion respectively correspond to a detection starting position and a detection ending position of a detectable region of the potential detection part along a first direction; a maximum distance along the first direction between orthographic projections of the detection starting portion and the detection ending portion on the image-forming region is L1; a length of the image-forming region along the first direction is L2; the first direction is in parallel with an axis direction of the photosensitive drum; and L1/L2>1/3.

* * * * *